(12) United States Patent
Newville

(10) Patent No.: US 12,714,225 B2
(45) Date of Patent: Aug. 25, 2026

(54) MULTIDIRECTIONAL TELEVISION MOUNTS WITH LEVER-PULLEY COUNTERBALANCING

(71) Applicant: Manehu Product Alliance, LLC, Carlsbad, CA (US)

(72) Inventor: Brian Newville, San Diego, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 0 days.

(21) Appl. No.: 18/766,464

(22) Filed: Jul. 8, 2024

(65) Prior Publication Data

US 2025/0040705 A1 Feb. 6, 2025

Related U.S. Application Data

(60) Provisional application No. 63/525,627, filed on Jul. 7, 2023.

(51) Int. Cl.
*A47B 97/00* (2006.01)
*F16M 11/00* (2006.01)

(52) U.S. Cl.
CPC .......... *A47B 97/001* (2013.01); *F16M 11/00* (2013.01); *F16M 2200/047* (2013.01); *F16M 2200/066* (2013.01)

(58) Field of Classification Search
CPC ...... A47B 9/12; A47B 97/001; G03B 21/145; F16M 11/18; F16M 11/046; F16M 2200/066; F16M 2200/047; F16M 11/00
USPC ...................................... 248/917–924, 277.1
See application file for complete search history.

(56) References Cited

U.S. PATENT DOCUMENTS

| | | | |
|---|---|---|---|
| 2,090,439 | A | 8/1937 | Carwardine |
| 2,630,854 | A | 3/1953 | Neher |
| 4,076,351 | A | 2/1978 | Wyant |
| 4,082,244 | A | 4/1978 | Groff |
| 4,561,674 | A | 12/1985 | Alessio |
| 4,691,886 | A | 9/1987 | Wendling et al. |

(Continued)

FOREIGN PATENT DOCUMENTS

| | | | |
|---|---|---|---|
| CA | 3073367 | A1 | 3/2019 |
| CN | 100411567 | C | 8/2008 |

(Continued)

OTHER PUBLICATIONS

ISA, International Preliminary Report on Patentability for International Application No. PCT/US2024/037089, Mail Date: Jan. 9, 2026, 10 pages.

(Continued)

*Primary Examiner* — Christopher Garft
(74) *Attorney, Agent, or Firm* — Ashurst Perkins Coie US LLP

(57) ABSTRACT

A mounting system capable of mounting objects to support structures is disclosed. The mounting system includes a wall mount including a display bracket configured to hold the object, a fixed support bracket couplable to a vertical support structure, and a linkage assembly. The linkage assembly has a low-profile stowed configuration in which the object is held in a raised position close to the support structure. The linkage assembly moves to another configuration to move the object. The object can be held in a lowered position. A biasing mechanism can facilitate convenient movement of the object.

22 Claims, 21 Drawing Sheets

(56) References Cited

U.S. PATENT DOCUMENTS 4,779,922 A 10/1988 Cooper
4,852,500 A 8/1989 Ryburg et al.
5,037,054 A 8/1991 McConnell
5,101,736 A 4/1992 Bommarito et al.
5,108,063 A 4/1992 Koerber et al.
5,135,191 A 8/1992 Schmuhl
5,224,677 A 7/1993 Close
5,299,993 A 4/1994 Habing
5,437,235 A 8/1995 Randolph
5,499,956 A 3/1996 Habing et al.
5,560,501 A 10/1996 Rupert
5,738,316 A 4/1998 Sweere et al.
5,743,503 A 4/1998 Voeller et al.
5,826,846 A 10/1998 Buccieri et al.
5,842,672 A 12/1998 Sweere et al.
5,845,587 A 12/1998 Ditonto
5,857,756 A 1/1999 Fehre
5,876,008 A 3/1999 Sweere et al.
5,909,934 A 6/1999 Mcgraw
5,988,076 A 11/1999 Vander
6,065,725 A 5/2000 Mason
6,065,909 A 5/2000 Cook
6,105,909 A 8/2000 Wirth et al.
6,296,408 B1 10/2001 Larkin et al.
6,419,196 B1 7/2002 Sweere et al.
6,523,796 B2 2/2003 Abramowsky et al.
6,592,090 B1 7/2003 Li
6,695,274 B1 2/2004 Chiu
6,712,008 B1 3/2004 Habenicht et al.
6,889,404 B2 5/2005 Lu et al.
6,905,101 B1 6/2005 Dittmer
6,983,917 B2 1/2006 Oddsen, Jr.
7,014,157 B2 3/2006 Oddsen
7,061,753 B2 6/2006 Michoux et al.
7,252,277 B2 8/2007 Sweere et al.
7,290,744 B2 11/2007 Baldasari
7,300,029 B2 11/2007 Petrick et al.
7,314,200 B2 1/2008 Bally et al.
7,345,870 B2 3/2008 Shin
7,395,996 B2 7/2008 Dittmer
7,398,950 B2 7/2008 Hung
7,448,584 B2 11/2008 Chen et al.
7,494,099 B2 2/2009 Shin
7,546,745 B2 6/2009 Lee et al.
7,546,994 B2 6/2009 Altonji et al.
7,640,866 B1 1/2010 Schermerhorn
7,663,868 B1 2/2010 Lam
7,721,658 B2 5/2010 Seeley et al.
7,823,973 B2 11/2010 Dragusin
7,854,415 B2 12/2010 Holbrook et al.
7,866,622 B2 1/2011 Dittmer
7,950,613 B2 5/2011 Anderson et al.
8,006,440 B2 8/2011 Thomas et al.
8,051,782 B2 11/2011 Nethken et al.
8,074,950 B2 12/2011 Clary
8,094,438 B2 1/2012 Dittmer et al.
8,333,355 B2 12/2012 Stifal et al.
8,382,052 B1 2/2013 Mathieson et al.
8,724,037 B1 5/2014 Massey
8,740,164 B2 6/2014 Tachibana
8,746,635 B2 6/2014 Kim et al.
8,783,193 B2 7/2014 Scharing
8,864,092 B2 10/2014 Newville
8,893,628 B2 11/2014 McKenzie et al.
8,960,632 B2 2/2015 Fallows
9,004,430 B2 4/2015 Conner
9,016,648 B2 4/2015 Smeenk
9,046,213 B2 6/2015 Huang
9,121,543 B2 9/2015 Dittmer et al.
9,167,894 B2 10/2015 Desroches et al.
9,265,346 B1 2/2016 Forney
9,433,293 B2 9/2016 Gross et al.
9,470,357 B2 10/2016 Hazzard et al.
9,554,644 B2 1/2017 Flaherty et al.
9,581,285 B2 2/2017 Ergun et al.
9,625,091 B1 4/2017 Massey
9,720,444 B2 8/2017 Holden
9,876,984 B2 1/2018 Massey
9,907,396 B1 3/2018 Labrosse et al.
9,921,726 B1 3/2018 Sculley et al.
9,999,557 B2 6/2018 Diaz-flores et al.
10,038,952 B2 7/2018 Labrosse et al.
10,085,562 B1 10/2018 Labrosse et al.
10,139,045 B1 * 11/2018 Keuter .................. F16M 11/38
10,159,336 B2 12/2018 Liao et al.
10,257,460 B2 4/2019 Massey
10,277,860 B2 4/2019 Massey
10,281,080 B1 5/2019 Massey
10,285,297 B2 5/2019 Bratcher et al.
10,376,158 B2 8/2019 Desroches
D879,514 S 3/2020 Goldberg et al.
10,659,279 B2 5/2020 Chiu et al.
10,738,941 B2 8/2020 Newville et al.
D895,325 S 9/2020 Goldberg et al.
10,768,663 B2 9/2020 Carson et al.
10,827,829 B1 11/2020 Labrosse et al.
10,830,580 B2 11/2020 Hodowany
10,859,201 B2 12/2020 Newville
10,935,180 B1 3/2021 Massey
10,980,339 B2 4/2021 Game et al.
11,019,920 B2 6/2021 Liao et al.
11,033,107 B2 6/2021 Warren
11,051,611 B2 7/2021 Goldberg et al.
11,077,547 B2 8/2021 Gosselin
11,089,865 B2 8/2021 Knapp et al.
11,178,354 B2 11/2021 Massey
11,266,232 B2 3/2022 Knapp et al.
11,284,713 B2 3/2022 Hazzard et al.
11,287,080 B2 3/2022 Newville et al.
11,297,940 B2 4/2022 Horn et al.
11,346,493 B2 5/2022 Massey
11,346,496 B2 5/2022 Newville
11,357,323 B2 6/2022 Nourse
11,460,145 B2 10/2022 Massey
11,607,042 B1 3/2023 Massey
11,668,434 B2 6/2023 Newville et al.
11,692,666 B2 7/2023 Patell
11,774,033 B2 10/2023 Massey et al.
11,781,702 B2 10/2023 Massey
11,781,703 B2 10/2023 Massey
11,802,653 B2 10/2023 Newville et al.
11,849,246 B1 12/2023 Massey
11,856,317 B2 12/2023 Massey
11,959,583 B2 4/2024 Newville et al.
12,022,941 B2 7/2024 Hazzard et al.
12,152,725 B2 11/2024 Newville et al.
12,295,493 B2 5/2025 Newville et al.
12,372,194 B2 7/2025 Newville et al.
2002/0020329 A1 2/2002 Kowalski
2002/0033436 A1 3/2002 Peng et al.
2002/0043978 A1 4/2002 McDonald
2002/0100851 A1 8/2002 Abramowsky et al.
2002/0179791 A1 12/2002 Kwon
2004/0084587 A1 5/2004 Oddsen
2005/0010911 A1 1/2005 Kim et al.
2005/0022699 A1 2/2005 Goza
2005/0110911 A1 5/2005 Childrey et al.
2005/0152102 A1 7/2005 Shin
2005/0204645 A1 9/2005 Bachinski et al.
2005/0217540 A1 10/2005 Novak
2005/0236543 A1 10/2005 O'Oeil
2006/0065166 A1 3/2006 Chi et al.
2006/0070210 A1 4/2006 Amdahl et al.
2006/0077622 A1 4/2006 Keely et al.
2006/0102819 A1 5/2006 Li
2006/0284037 A1 12/2006 Dittmer et al.
2007/0007412 A1 1/2007 Wang
2007/0007413 A1 1/2007 Jung et al.
2007/0023599 A1 2/2007 Fedewa
2007/0030405 A1 2/2007 Childrey et al.
2007/0040084 A1 2/2007 Sturman et al.
2007/0205340 A1 9/2007 Jung
2007/0221807 A1 9/2007 Park
2007/0252056 A1 11/2007 Novin

(56) References Cited

U.S. PATENT DOCUMENTS

2008/0078906 A1 4/2008 Hung
2008/0237424 A1 10/2008 Clary
2009/0032656 A1 2/2009 Oh
2009/0034178 A1 2/2009 Le
2009/0050757 A1 2/2009 Oh et al.
2009/0050763 A1 2/2009 Dittmer
2009/0108158 A1 4/2009 Kim et al.
2009/0166501 A1 7/2009 Wang et al.
2009/0179133 A1 7/2009 Gan et al.
2009/0206221 A1 8/2009 Timm et al.
2009/0212669 A1 8/2009 Robert-Reitman et al.
2010/0006725 A1 1/2010 Kim et al.
2010/0024691 A1 2/2010 Weber
2010/0091438 A1 4/2010 Dittmer
2010/0123059 A1 5/2010 Saez
2010/0149736 A1 6/2010 Dittmer et al.
2010/0155558 A1 6/2010 Zhang et al.
2010/0171013 A1 7/2010 Anderson et al.
2010/0207006 A1 8/2010 Kim
2011/0043978 A1 2/2011 Bremmon et al.
2011/0108688 A1 5/2011 Parruck
2011/0198460 A1 8/2011 Stifal et al.
2011/0234926 A1 9/2011 Smith
2012/0032062 A1 2/2012 Newville
2012/0033371 A1 2/2012 Pankros et al.
2012/0061543 A1 3/2012 Juan
2012/0167486 A1 7/2012 Lee
2013/0032682 A1 2/2013 Bell
2013/0082156 A1 4/2013 Conner
2013/0176667 A1 7/2013 Kulkarni et al.
2013/0187019 A1 7/2013 Dittmer et al.
2013/0199420 A1 8/2013 Hjelm
2013/0221174 A1 8/2013 Sapper et al.
2013/0320163 A1 12/2013 Wong
2014/0077050 A1* 3/2014 Huang .................... A47B 9/10
248/297.11
2014/0208985 A1 7/2014 Desroches et al.
2014/0211100 A1 7/2014 Massey
2014/0311050 A1 10/2014 Kincaid et al.
2015/0053830 A1* 2/2015 Kuo .................... F16M 11/046
248/297.11
2015/0138304 A1 5/2015 Mcardell et al.
2015/0245707 A1 9/2015 Saab
2015/0277214 A1 10/2015 Schuh
2016/0120309 A1 5/2016 Brandt et al.
2016/0270528 A1 9/2016 Scharing
2017/0105529 A1 4/2017 Kozlowski et al.
2017/0143117 A1 5/2017 Koulizakis
2018/0054156 A1 2/2018 Lokey
2018/0131895 A1 5/2018 Massey
2018/0310459 A1 11/2018 Blunier
2018/0352189 A1 12/2018 Massey
2019/0029414 A1 1/2019 Nourse et al.
2019/0059574 A1 2/2019 Paul et al.
2019/0072231 A1 3/2019 Newville et al.
2019/0309895 A1 10/2019 Newville
2019/0335135 A1 10/2019 Massey
2019/0343272 A1 11/2019 Smith et al.
2019/0374025 A1 12/2019 Bowman
2020/0022492 A1 1/2020 Patrick et al.
2020/0049304 A1 2/2020 Hung
2020/0355319 A1 11/2020 Newville et al.
2020/0390009 A1 12/2020 Whitehead et al.
2020/0408353 A1 12/2020 Massey
2021/0190259 A1 6/2021 Newville
2021/0247019 A1* 8/2021 Newville ............. F16M 11/121
2022/0150441 A1 5/2022 Massey
2022/0178493 A1 6/2022 Seol et al.
2025/0383043 A1 12/2025 Newville et al.

FOREIGN PATENT DOCUMENTS

CN 103371623 A 10/2013
CN 104214491 A 12/2014
CN 104424849 A 3/2015
CN 106704779 A 5/2017
CN 109605346 A 4/2019
CN 109906432 A 6/2019
CN 111031859 A 4/2020
CN 109605346 B 8/2020
CN 211232332 U 8/2020
EP 3662786 A1 6/2020
GB 2222939 A 3/1990
JP 2009014047 A 1/2009
KR 100705069 B1 4/2007
KR 20070081731 A 8/2007
WO 2018098022 A1 5/2018
WO 2019043670 A1 3/2019
WO 2019183822 A1 10/2019
WO 2021006987 A1 1/2021
WO 2021127552 A1 6/2021

OTHER PUBLICATIONS

ISA, International Search Report and Written Opinion for International Application No. PCT/US2024/037089; Date of Mailing: Oct. 24, 2024; 14 pages.
MantelMount MM750 Pro Above Fireplace Pull Down TV Mount, accessed Dec. 3, 2020 from https://www.mantelmount.com/products/mm750-pro-pull-down-tv-mount, 6 pages.
MantelMount RB100 Recess Box—MantelMount Pull Down TV Mount Accessory, accessed Dec. 3, 2020 from https://www.mantelmount.com/products/mantelmount-rb100-recess-box, 6 pages.

* cited by examiner

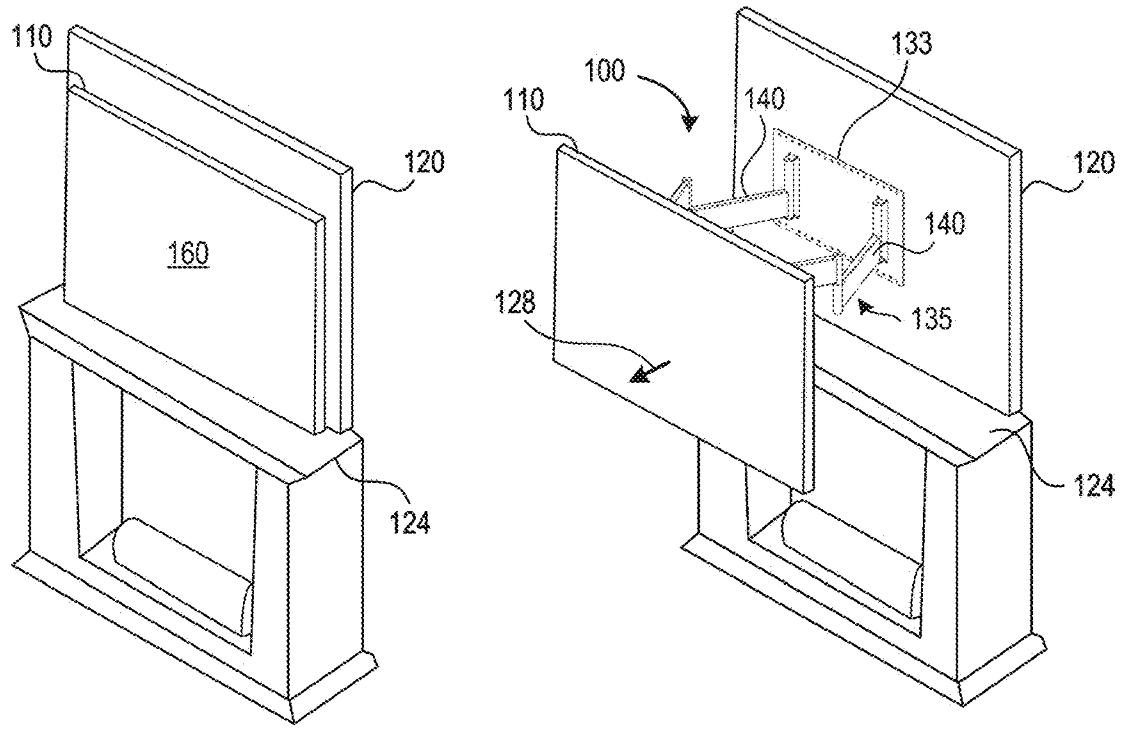
*FIG. 1*
*FIG. 2*
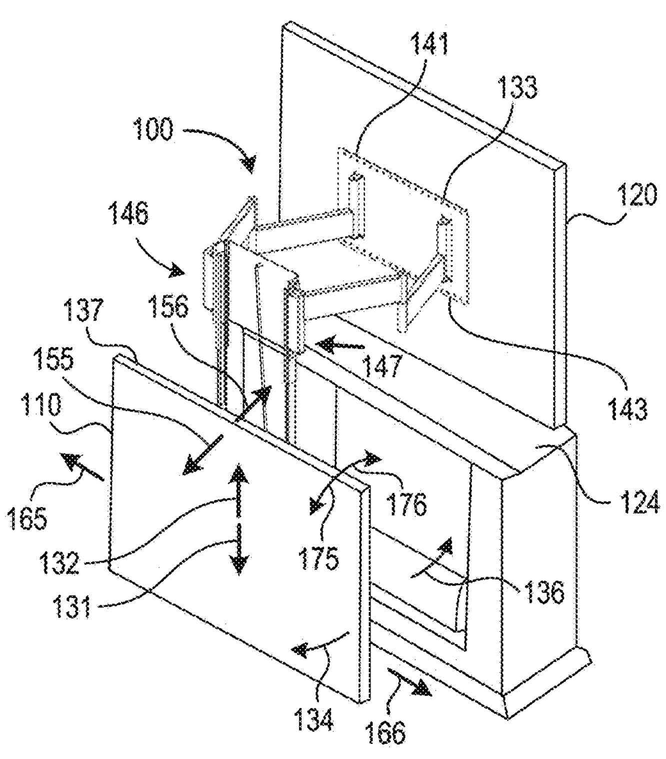
*FIG. 3*

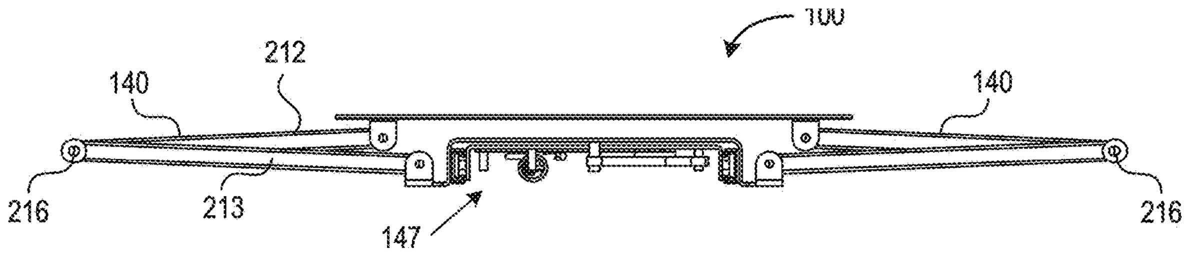
FIG. 8
100
147
556
574
216
213
140
140
216
900
212
260
670
558
570
562
FIG. 9
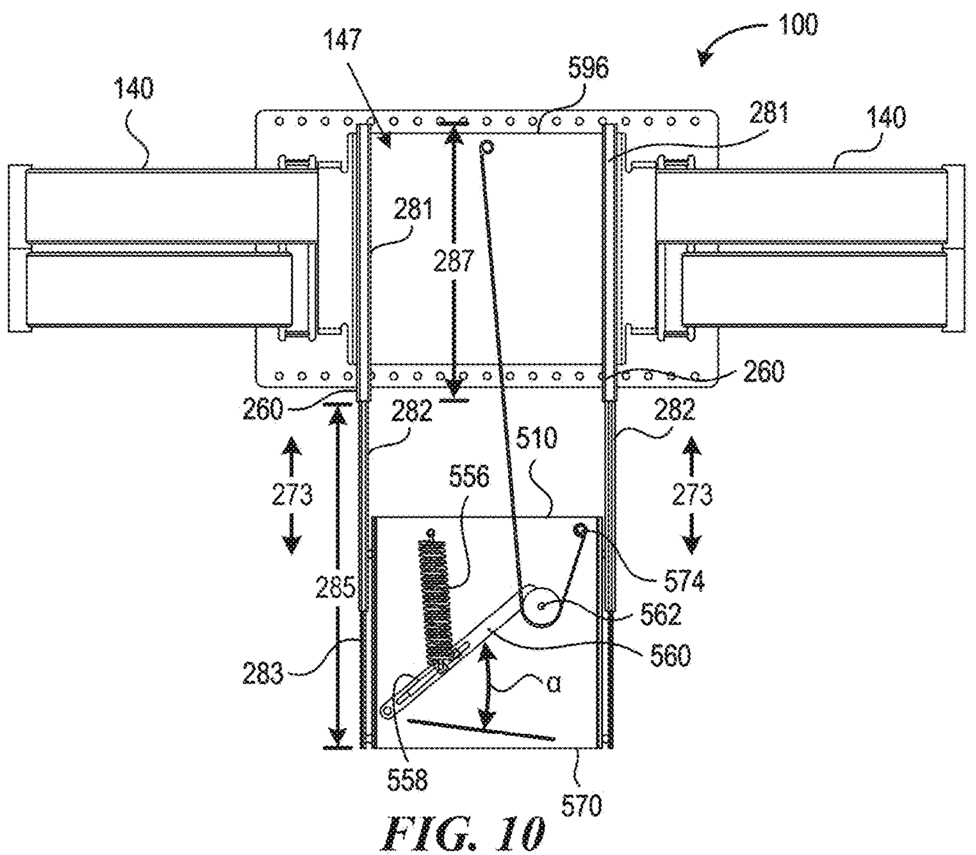
FIG. 10

MULTIDIRECTIONAL TELEVISION MOUNTS WITH LEVER-PULLEY COUNTERBALANCING

CROSS-REFERENCE TO RELATED APPLICATION

The present application claims the benefit of U.S. Provisional Patent Application No. 63/525,627, filed Jul. 7, 2023, the disclosure of which is incorporated herein by reference in its entirety.

TECHNICAL FIELD

The present invention relates generally to mounting systems. More specifically, the invention relates to multidirectional display mounts for mounting televisions to structures.

BACKGROUND

Televisions are often mounted directly to walls using wall mounts. Tilting wall mounts and horizontal motion wall mounts are two types of mounts that allow movement of the television. Tilting wall mounts often allow tilting about a horizontal axis of rotation. Unfortunately, if tilting wall mounts are installed at relatively high locations, there may be limited viewing because ideal viewing often requires that the center of the screen be level with a viewer's eyes. Horizontal motion wall mounts often allow movement of the television away from walls, swiveling of the television, and/or tilting of the television. If either a tilting wall mount or a horizontal motion wall mount is installed above a fireplace, the mounted television is often much higher than a sitting viewer's eyes and, thus, may not provide comfortable viewing.

BRIEF SUMMARY

At least some embodiments are directed to mounts capable of holding and moving objects with, for example, minimal or no user-applied force. Mounted objects can be held at relatively high locations to keep the objects out of the way when stowed. Mounted objects can be conveniently moved to desired positions. Mounts can include a wall mounting bracket, a television mounting bracket configured to carry a television, a positioner mechanism configured to allow independent multidirectional linear movement of the television mounting bracket, and a lever-pulley counterbalance assembly. The lever-pulley counterbalance assembly can include a pulley system and a biasing lever. The biasing lever can engage the pulley system such that a counterbalancing force is provided as the biasing lever rotates when the television mounting bracket moves vertically (e.g., moves from a lowered position to a raised position). The counterbalancing force can at least partially counteract the weight of the television and the moving components of the lever-pulley counterbalance assembly, thereby reducing the required applied force from a user and/or an actuator to move (e.g., raise or lower) the television.

In certain embodiments, a wall mount can hold an electronic display in the form of a television. The wall mount can be installed above a fireplace or other aesthetically pleasing location. A user can manually or automatically lower the television such that the television is generally in front of the fireplace. A viewer's eyes can be generally level with the center of the screen. The television can be panned, tilted (e.g., rotated about a generally horizontal axis), and/or swiveled (e.g., rotated about a generally vertical axis) to accommodate different viewing positions. Pivots, swivels (e.g., swivel brackets), joints, auto-positioning, or the like can be used to provide the desired motion. The television can range in weight from, for example, about 20 pounds to about 110 pounds.

BRIEF DESCRIPTION OF THE DRAWINGS

In the drawings, identical reference numbers identify similar elements or acts.

FIG. 1 is a pictorial view of a television installed above a fireplace.

FIG. 2 shows the television in a raised forward position.

FIG. 3 shows the television in a lowered forward position in front of the fireplace.

FIG. 8 is a top view of components of a multidirectional display mount in accordance with an embodiment of the technology.

FIG. 9 is a front view of the components of FIG. 8 in a raised position.

FIG. 10 is a front view of the components of FIG. 8 in a lowered position.

DETAILED DESCRIPTION

Figure 4:
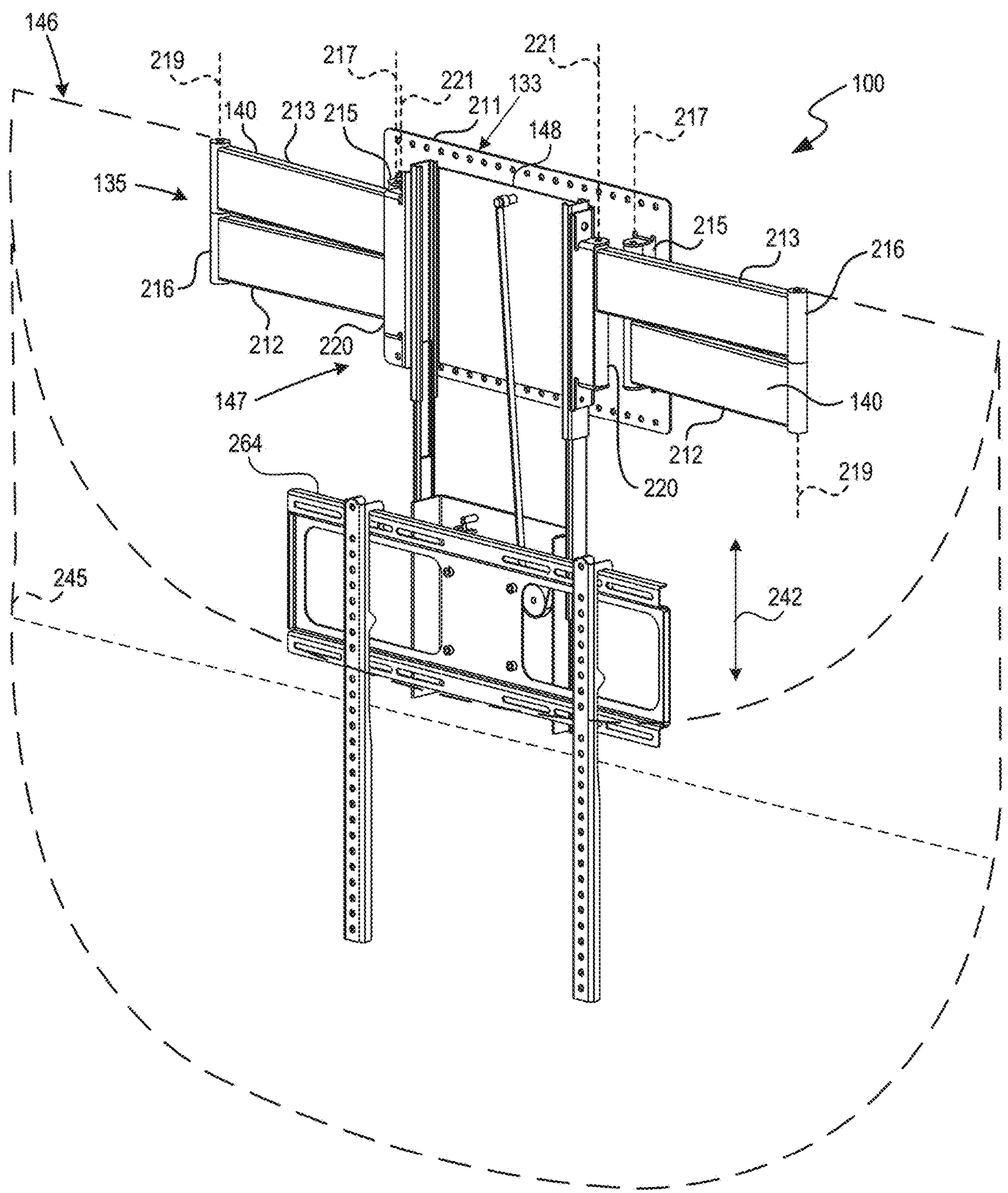
FIG. 4 is an isometric view of a multidirectional display mount in accordance with an embodiment of the technology.

FIG. 1 shows a display or television 110 ("television 110") in a raised rearward or stowed position and very close to a wall 120. FIG. 2 shows the television 110 in a raised forward position. FIG. 3 shows the television 110 in a lowered, forward position in front of the fireplace. A multidirectional display mount 100 ("display mount 100," sometimes also referred to herein as a "television mount," a "mount device," or a "television mount device"), which is visible in FIGS. 2 and 3, can be hidden from the view of someone located in front of the stowed television 110 for an aesthetically pleasing appearance. The display mount 100 allows the television 110 to be moved in different directions to avoid contacting obstacles. For example, the television 110 can be moved independently in the horizontal direction (e.g., forward-back direction, lateral direction, etc.), vertical direction, or another direction. In some manually operated embodiments, a user can conveniently grasp and pull the television 110 away from the wall 120. The bottom of the television 110 can be kept at substantially the same height to avoid striking the top of a mantelshelf 124 (sometimes referred to herein as a "mantel 124"). After the bottom of the television 110 has moved forwardly past the mantelshelf 124, the television 110 can be pulled downwardly past the top surface of the mantelshelf 124. In this manner, the television 110 can be brought down and in front of the mantelshelf 124 or any other protruding object below the display mount 100.

FIG. 1 shows the stowed television 110 positioned above a fireplace to avoid occupying usable space and to reduce the likelihood of unwanted inadvertent contact by people moving about the room. If the fireplace includes a hearth, it may be difficult for small children, or other individuals, to inadvertently contact the stowed television 110. In some embodiments, the television 110 can be generally flat against or parallel to the wall 120 (e.g., parallel to the wall 120) to minimize or limit unwanted reflections from a screen 160 that may be directed to someone sitting on furniture in front of the television 110, especially when the television 110 is turned off. The bottom of the television 110 can be held directly above the mantelshelf 124.

FIG. 2 shows the raised television 110 after a user has pulled, as indicated by arrow 128, the television 110 away from the wall 120. For example, a user can grip and pull the television 110 horizontally away from the wall 120 while the display mount 100 holds the television 110 in an upright orientation. The display mount 100 can include a wall mounting portion 133 and a multidirectional actuation apparatus with an extender assembly 135 rotatably coupled to the wall mounting portion 133. The extender assembly 135 can include one or more articulating arms 140 that allow horizontal movement of the television 110. In some embodiments, including the illustrated embodiment, the extender assembly 135 includes a pair of articulating arms 140. A user can apply forces to the television 110 to independently articulate the articulating arms 140 for lateral movement, swiveling, and/or complex movements of the television 110. The television 110 can be moved vertically downward to a desired lowered position while the articulating arms 140 remain in the horizontal orientation. The display mount 100 can include a lever-pulley counterbalance assembly that counterbalances the television. The lever-pulley counterbalance assembly can include a pulley system and a biasing lever that cooperate to provide a counterbalancing force as the biasing lever rotates when the television mounting bracket moves vertically (e.g., moves vertically from a raised position of FIG. 1 to a lowered position of FIG. 3).

FIG. 3 shows the television 110 after it has been moved to a lowered forward position. The display mount 100 includes a dynamic component in the form of a multidirectional positioner mechanism or actuation apparatus 146 ("actuation apparatus 146") configured to provide, for example, forward/rearward movement (indicated by arrows 155, 156), side-to-side swiveling (indicated by arrows 134, 136), vertical movement (indicated by arrows 131, 132), and/or side-to-side movement (indicated by arrows 165, 166). In some embodiments, the display mount 100 includes a tilt mechanism configured for tilting (indicated by arrows 175, 176) or other components for additional movement.

The actuation apparatus 146 can include the extender assembly 135 and a vertical positioner mechanism 147. The vertical positioner mechanism 147 can include a lever-pulley counterbalance assembly configured to counterbalance the weight of the television 110. The lever-pulley counterbalance assembly can hold the television 110 and also allow the raising/lowering of the television 110 with a minimal amount of applied force. The television 110 can remain spaced apart from the mantel 124. A top 137 of the television 110 (e.g., when in a lowermost position) can be lower than most or all of the wall mounting portion 133. The screen of the television 110 can be substantially perpendicular to a sitting viewer's line of sight, substantially parallel to a front surface of the wall 120, or at another desired orientation. For example, the top 137 of the lowered television 110 can be lower than a top 141 and/or a bottom 143 of the wall mounting portion 133. One or more adjustable or fixed stops can be used to prevent contact with the mantel 124 or to achieve repeatable positioning, or both. The stops can be incorporated into components of the display mount 100, and the configuration of the actuation apparatus 146 can be selected based on a target motion, range of motion, and/or number of degrees of freedom.

The lowered television 110 is especially well suited for viewing when someone is positioned near the television 110, for example, to play a game system (e.g., Xbox 360, PlayStation®, PlayStation® 2, PlayStation® 3, Nintendo game system, or the like), or to provide convenient viewing while sitting, for example, on furniture or on the floor. The display mount 100 allows the television 110 to be moved horizontally away from the fireplace to prevent excess heating of the television 110 when the fireplace is used. The television 110 can be returned to the stowed position of FIG. 1.

The display mount 100 allows the television 110 to be deployed along different paths of travel and can include one or more pivots, swivels (e.g., swivel brackets, auto-straightening devices, etc.), joints, stops, locks, brakes, friction elements, or the like. For two-step positioning, the television 110 can be moved horizontally from the stowed position (FIG. 1) to a raised forward position (FIG. 2). The television 110 can then be lowered to a lowered forward position (FIG. 3). The two-step positioning can be used to keep the television 110 spaced apart from the mantelshelf 124. In some embodiments, the display mount 100 has a mechanical or electrical release (e.g., a user-assist device or mechanism) that allows the television 110 to be lowered after the television 110 has moved, for example, to a preset position, a distance from the wall, or a distance from another reference point. This prevents contact between the television and the mantelshelf 124. In other embodiments, the user can determine when to pull down on the television 110 to overcome the counterbalancing force, thereby lowering the television to the desired height. For one-step positioning, the television 110 can be moved along a curved path or linear path from the stowed position (FIG. 1) to the lowered forward position (FIG. 3).

The display mount 100 can be coupled to a wide range of different types of support structures, such as walls of a dwelling (e.g., a house, an apartment, etc.), an office, a lobby, a bar (e.g., sports bar), a restaurant, or the like and can be mounted to vertical walls or non-vertical walls, including, without limitation, angled walls, non-planar walls, or other structures sturdy enough to handle the load of the display mount 100 and any attached object(s). The wall mounting portion 133 can be configured to be mounted to a surface of the wall 120. For example, as discussed in more detail below, a substantial portion of the display mount 100 can be housed within a recessed box or housing located within a wall when in a stowed configuration. In some embodiments, the display mount 100 can collapse into the recessed box or housing such that a majority of, or all of, the moving components of the display mount 100 are within the wall. In some embodiments, the television and/or television bracket can be generally flush with an exterior surface of the wall.

In some motorized embodiments, the display mount 100 can include motorized swivel mechanisms, swivel/tilting mechanisms, drive motors, or the like to provide motorized positioning and can include one or more controllers. The positioning capabilities of the display mount 100 can be selected based on target viewing positions. In some manually operated embodiments, a user can conveniently grasp and pull the television 110 away from the wall 120. The bottom of the television 110 can automatically swing away from the wall 120 to keep the television 110 from striking the top of a mantel 124. After the bottom of the television 110 has moved forwardly past the mantel 124, the television 110 can be lowered downwardly past the top surface of the mantel 124. In this manner, the television 110 can be manually brought down and in front of the mantel 124 or any other protruding object below the wall mounting portion 133. In some embodiments, the display mount 100 can have both a manual mode for manually moving the television and a motorized mode for robotically moving the television.

The display mount 100 can include one or more features that prevent contact with the mantel 124 or provide repeatable positioning, or both. The features can include fixed stops, friction elements, motion inhibitors, or other elements that can be incorporated into the display mount 100. The display mount 100 can also include one or more biasing mechanisms, counterbalancing mechanisms, drive trains, pulley systems, gear systems, motors, indexers, sprockets, belts, chains, or combinations thereof. In some embodiments, the display mount 100 can have four, five, or six degrees of freedom, thereby allowing a user to precisely position a TV. The number and configuration of components of the display mount 100 can be selected based on the degrees of freedom and range of motion.

The television 110 can be, without limitation, a liquid crystal display (LCD) television, a plasma television, a light emitting diode (LED) television, or other type of flat-screen television, as well as other types of wall-mountable televisions. The weights of such televisions are often in a range of about 20 pounds to about 110 pounds and often have a maximum thickness less than about 5 inches. In some embodiments, the television weighs at least about 20 pounds, 40 pounds, 60 pounds etc. The display mount 100 holds the television 110 in an upright orientation while the television 110 is pulled downwardly. Advantageously, large screen televisions have a screen with a length (measured diagonally) equal to or greater than about 30 inches, 50 inches, 60 inches, 70 inches, 80 inches, 85 inches, etc., and can hide the entire display mount 100, as shown in FIG. 1. The display mount 100 can also hold small or medium screen televisions. Other types of electronic displays (e.g., monitors) or objects can be carried by the display mount 100. Exemplary mountable objects include, but are not limited to, screens suitable for use with front projectors, boards (e.g., a chalkboard, a dry erase board, etc.), containers (e.g., a basket, a bin, etc.), or the like.

FIG. 4 is an isometric view of the multidirectional display mount 100 of FIGS. 1-3. The wall mounting portion 133 can include a plate or member 211 and pivots 215. Each of the articulating arms 140 is coupled to a respective pivot 215 on a bracket 148 that is coupled to the vertical positioner mechanism 147. Each of the articulating arms 140 can be independently articulated to allow swiveling, panning, rotation, and/or displacement of the bracket 148, thereby also articulating the vertical positioner mechanism 147. By independently operating the arms 140, desired movement of the television 110 can be achieved. For example, the television can be moved to a nonparallel or parallel relationship to the wall mounting portion 133 and/or wall 120 (FIGS. 1-3).

Each articulating arm 140 can include arms 212, 213 pivotally coupled to the wall mounting portion 133 and vertical positioner mechanism 147, respectively. For example, each arm 212 is rotatable about axes of rotation 217 defined by the pivot 215. Each arm 213 is rotatable about an axis of rotation 219 defined by a pivot 216 and rotatable about an axis of rotation 221 defined by a pivot 220. In the illustrated embodiment, the axes of rotation 217, 219, 221 are generally parallel and at substantially vertical orientations. This allows the vertical positioner mechanism 147 to be moved horizontally, as indicated by arrow 242. The extender assembly 135 can hold the upper portion of the vertical positioner mechanism 147 vertically stationary while the television 110 is lowered. The number, orientations, and positions of the axes can be selected based on the desired range of motion.

The display mount 100 can be configured to move the television within a television positioning envelope 245 (illustrated in dashed line). For example, the actuation apparatus 146 can provide a three-dimensional range of motion within the television positioning envelope 245. A user can manually grasp and pull the television anywhere within the television positioning envelope 245. In some embodiments, including the illustrated embodiment, the television positioning envelope 245 has a partially cylindrical volume that is located generally below the display mount 100. As such, the television can be moved along an arcuate path extending laterally to the sides of the wall mounting portion 133. The range of travel in the forward/rearward direction can be about 40%, 50%, 60%, 70%, 80%, or 90% of the maximum lateral travel (e.g., total distance of travel in opposite directions away from sides of the wall mounting portion 133). The television positioning envelope 245 can have a substantially semi-circular shape, semi-elliptical shape, or another cross-sectional shape taken along a plane that is perpendicular to a vertical axis. The configuration, dimensions, and connections between components of the display mount 100 can be selected based on the desired size and configuration of the television positioning envelope 245. The display mount 100 can include, without limitation, one or more stops, positioning features (e.g., pins, locks, etc.), extenders, contractors, or other features for adjusting the configuration of the television positioning envelope 245 and/or display mount 100. This allows for flexibility after installation. For example, if an object is placed underneath the display mount 100, components can be installed to limit motion to avoid contact between the TV and the object.

Figure 5:
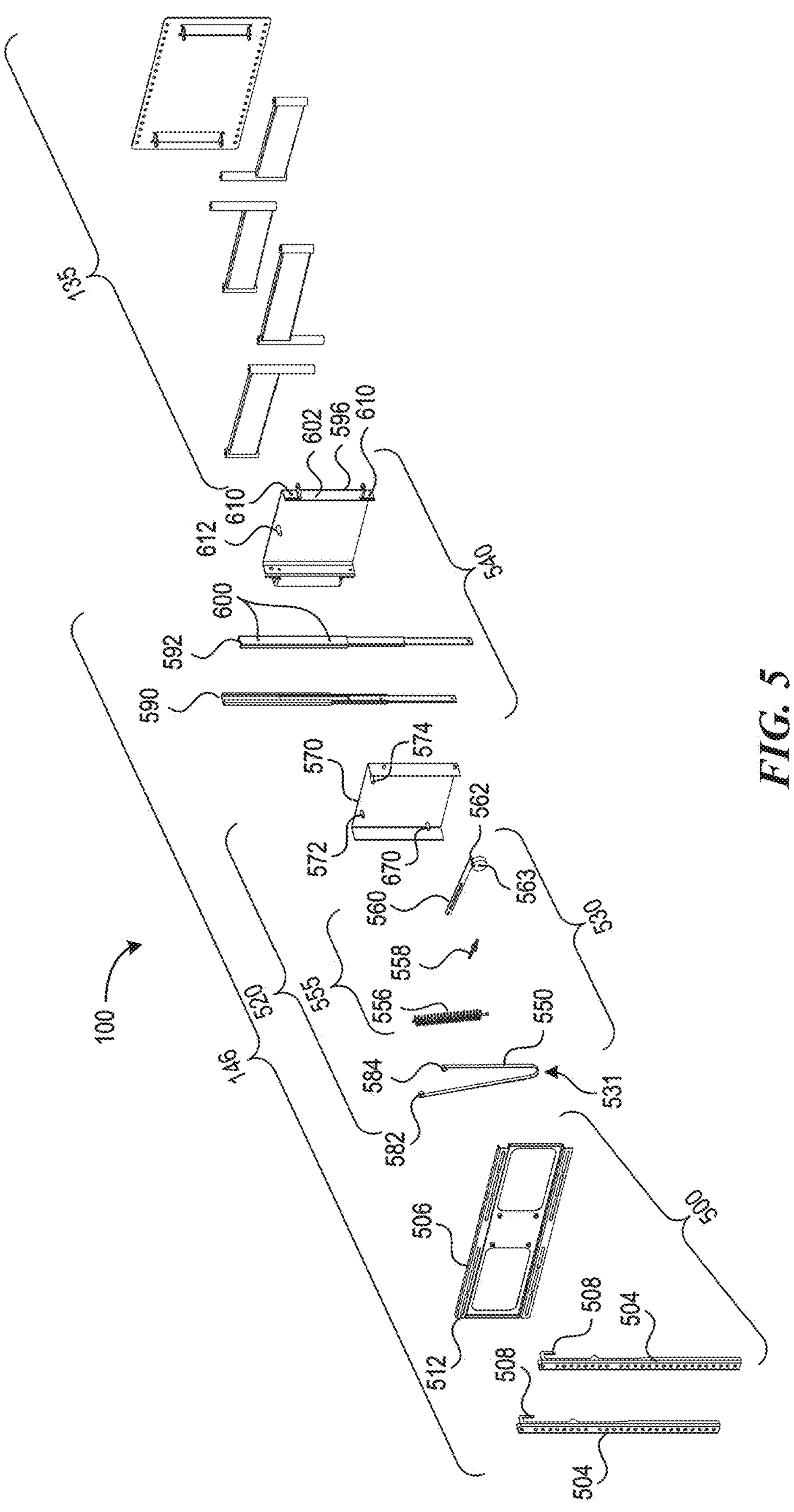
FIG. 5 is an isometric exploded view of the display mount of FIG. 4.

FIG. 5 is an exploded isometric view of the display mount 100. The actuation apparatus 146 includes a television bracket 500 and vertical wall slider 520. Television bracket 500 includes one or more television braces and a television frame 506. The television braces can include hangers 508, elongated rails or braces 504, and other components for coupling to televisions. The number and configuration of the television braces 504 can be selected based on the mounting features of the television. In some embodiments, fasteners (e.g., bolts, pins, etc.) can be passed through openings in the braces 504 to couple the television to the television braces 504. The hangers 508 can be slid along an upper edge 512 of the television frame 506. The television frame 506 can be smaller than the back side of the television such that the television frame 506 is not visible from the front of the television. In some embodiments, the television frame 506 can include one or more sliders, notches, or other features for positioning the braces 504. For example, the upper edge 512 can include notches for receiving the hangers 508. The number of components and configuration of the television bracket 500 can be selected based on the configuration of the television.

The wall slider 520 can include a lever-pulley counterbalance assembly 530 ("counterbalance assembly 530") and a slider rail system 540. The counterbalance assembly 530 can include a pulley system 531 connected to a biasing lever 555. The biasing lever 555 is configured to engage the pulley system 531 to provide a counterbalancing force (e.g., a constant or variable counterbalancing force) while the biasing lever 555 rotates upon vertical movement of the television mounting bracket 130. The pulley system 531 can include a connector 550 and a movable pulley 562, and the biasing lever 555 can include a pulley arm 560. In some embodiments, the connector 550 can include a belt, a chain, a tether, or another flexible member for engaging the movable pulley 562, which is rotatably coupled to the pulley arm 560 by a pivot 563. A biasing device 556 can be connected to an optional adjuster 558 and include one or more springs (e.g., coil springs, helical springs, etc.) or other biasing elements. Example biasing devices are discussed in connection with FIGS. 14-18.

The counterbalance assembly 530 can also include a vertical moving plate 570 that includes connector mounts 572, 574. The connector 550 can have mounting ends 582, 584 couplable to the mounts 572, 574. The biasing device 556 can be coupled to the mount 572 and the adjuster 558 of the pulley arm 560. The position, configuration, and location of the mounts 572, 574 of the vertical moving plate 570 can be selected based on the configuration of the connector 550 and the biasing device 556.

Still referring to FIG. 5, the slider system 540 can include slider rails 590, 592 and a vertical fixed plate 596. Each slider rail 590, 592 can include openings 600. Fasteners can pass through openings 610 of a fixed plate side wall 602 to mount a corresponding rail 590, 592. The components and configuration of the slider rail system 400 can be selected based on the desired length of travel.

Figure 6:
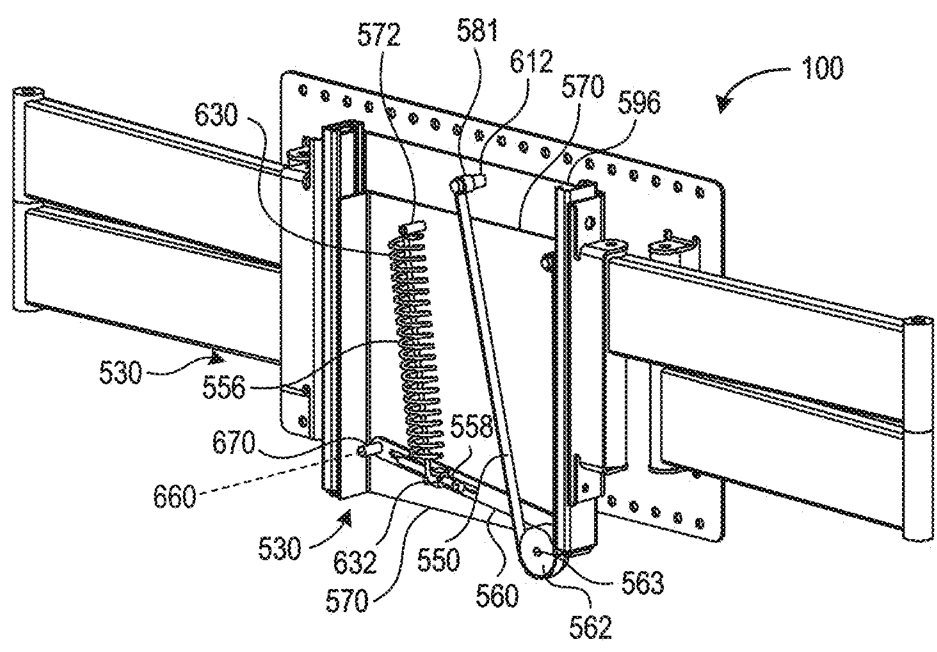
FIG. 6 is an isometric view of a lever-pulley counterbalance assembly in a rearward position.
Figure 7:
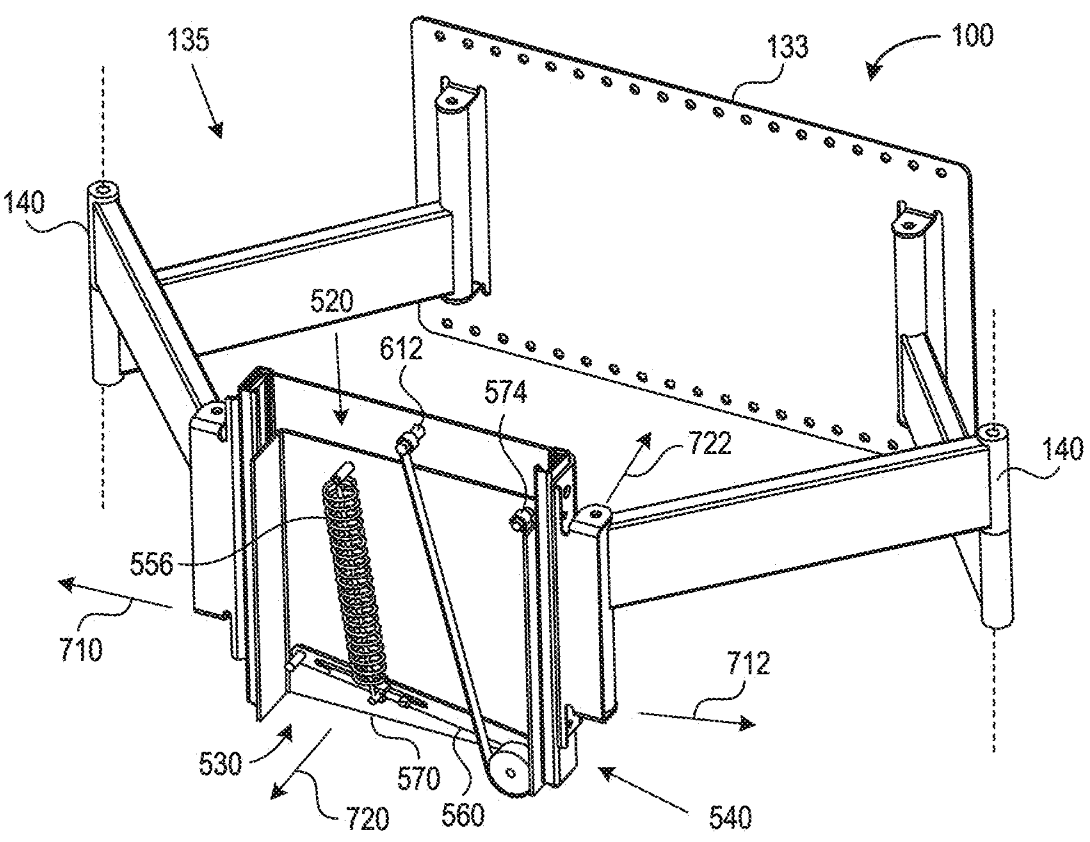
FIG. 7 is an isometric view of the lever-pulley counterbalance assembly in a forward position.

FIG. 6 is an isometric view of the lever-pulley counterbalance assembly 530 in a rearward, raised position. FIG. 7 is an isometric view of the counterbalance assembly 530 in a forward, raised position. FIGS. 6 and 7 show the display mount 100 without the television bracket 500 to show internal components. Referring now to FIG. 6, an end 581 of the connector 550 is coupled to the mount 612 (e.g., a peg, a rod, etc.) of the vertical fixed plate 596. The connector 550 wraps around the movable pulley 562 and is coupled to the mount 574 (shown in FIGS. 5 and 7) of the vertical moving plate 570. The pulley arm 560 is rotatable about an axis of rotation 660 defined by a pin or pivot 670 of the vertical moving plate 570.

Referring to FIG. 6, the biasing device 556 can be housed between the side walls of the vertical moving plate 570. This allows the operation of the biasing device 556 without exposing moving components that can cause, for example, pinching of a user's hand. The biasing device 556 can include an upper end 630 coupled to the mount 572 and a lower end 632 coupled to the adjuster 558. The adjuster 558 can be operated to adjust the position of the biasing device 556, thereby adjusting counterbalancing. Example counterbalancing adjustments are discussed in connection with FIGS. 14 and 15.

Referring to FIG. 7, the articulating arms 140 are shown bent to position the vertical slider system 540 centrally with respect to a wall plate 700. A user can manually push the television laterally (indicated by arrows 710, 712), forwardly or rearwardly (indicated by arrows 720, 722), to position the television at different positions. The wall slider 520 can hold the television at a vertical height during this movement to prevent the television (or display mount 100) from striking objects below.

FIGS. 8 and 9 are top and front views of components of the display mount 100 in accordance with an embodiment of the technology. Some television mounting components (e.g., television bracket 500 of FIG. 5) are not shown. The positioner mechanism 147 can be generally positioned between the folded articulating arms 140 for a thin profile, as shown in FIG. 8. The arms 212, 213 are generally parallel to one another and in a generally vertical arrangement. In some embodiments, the arm 213 is located above the arm 212. In other embodiments, the arm 212 is located above the arm 213. Each pivot 216 can include a pin extending through openings in the arms 212, 213. The configuration and position of the arms 212, 213 and pivots 216 can be selected based on the desired collapse configuration and expand configuration.

FIG. 10 is a front view of the display mount 100 with the positioner mechanism 147 in a lowered position. The positioner mechanism 147 can include a telescoping assembly 260 coupled to the extender assembly 135 and/or TV frame 257. The telescoping assembly 260 can include extenders or slider rails that cooperate to allow the TV mounting portion to be translated vertically, as indicated by arrows 273. The extenders include, without limitation, one or more linear slides, rails (e.g., slider rails 590, 592 of FIG. 5), telescoping assemblies, carriage/rail assemblies, or the like. In some embodiments, the extenders include a plurality of linear slides that extend from one another to lower the TV mounting portion. For example, FIG. 10 shows each extender having an upper rail 281 connected to the vertical fixed plate 596, a lower rail 283 connected to the television frame (not shown) and/or vertical movable plate 570, and one or more intermediate rails 282. When the television is lowered, the intermediate rails 282 and the lower rails 283 can be sequentially or concurrently slid out from the upper rail 281. This allows the travel distance 285 of the TV frame 506 to be longer than a length 287 of the upper rail 281. In some embodiments, a ratio of the travel distance 285 to the length 287 can be equal to or greater than 1.5, 2, 2.5, 3, 3.5, 4, or other ratios. The lengths of travel can be selected based on the desired range of vertical movement provided by the display mount 100. In some embodiments, the telescoping assembly 260 can include one or more telescoping poles connecting the TV frame (TV frame 506 of FIG. 5) to the vertical moving plate 570, or other components of the display mount 100. The number, configuration, and orientation of the components of the telescoping assembly 260 can be selected based on the desired range of motion.

FIGS. 9 and 10 show the pulley arm 560 is in a lowered position and raised position, respectively. A user can operate the adjuster 558 to move the biasing device 556 along the pulley arm 560. Referring now to FIG. 9, when a user pulls down on the television, the user-applied force can overcome the biasing force provided by the biasing device 556. Teeth of the movable pulley 562 can engage teeth of the connector 550 such that the pulley arm 560 rotates upwardly, as indicated by arrow 900, as the movable pulley 562 moves along the connector mount 574. The angle of rotation a (FIG. 10) of the pulley arm 560 can be equal to or greater than about, for example, 20 degrees, 30 degrees, 40 degrees, 45 degrees, or other angles. The configuration and angle of rotation of the pulley arm 560 can be selected based on the desired range of travel. The biasing device 556 is gradually contracted until the television reaches the lowered position. The mechanical advantage provided by the pulley arm 560 and the biasing device 556 allows for a relatively small counterbalance mechanism footprint behind the television while providing a large range of travel of the television bracket 500. The biasing characteristics of the biasing device 556 can be selected based on desired counterbalancing forces. In some embodiments, multiple biasing devices 556 can be connected to the pulley arm 560. This allows for customization of the counterbalancing forces. Additionally, the adjuster 558 can be operated to increase or decrease the extension/compression of the biasing device 556.

Figure 11:
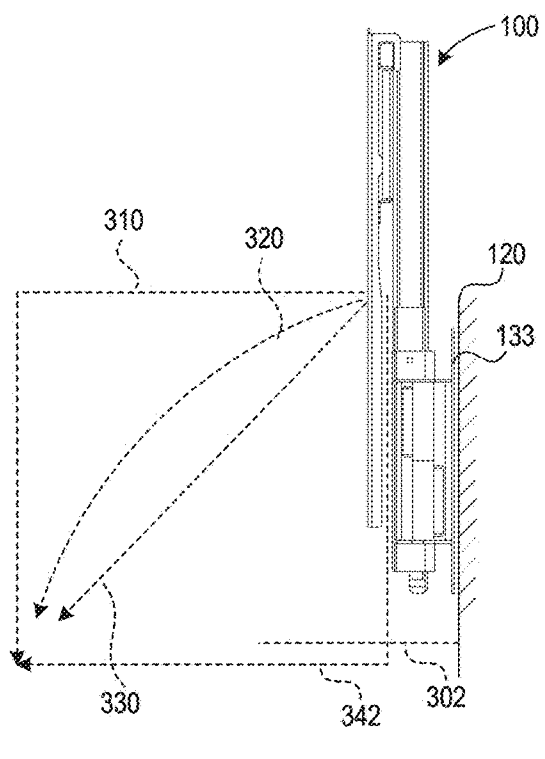
FIGS. 11-13 are side views of a multidirectional display mount in different configurations in accordance with an embodiment of the technology.
Figure 12:
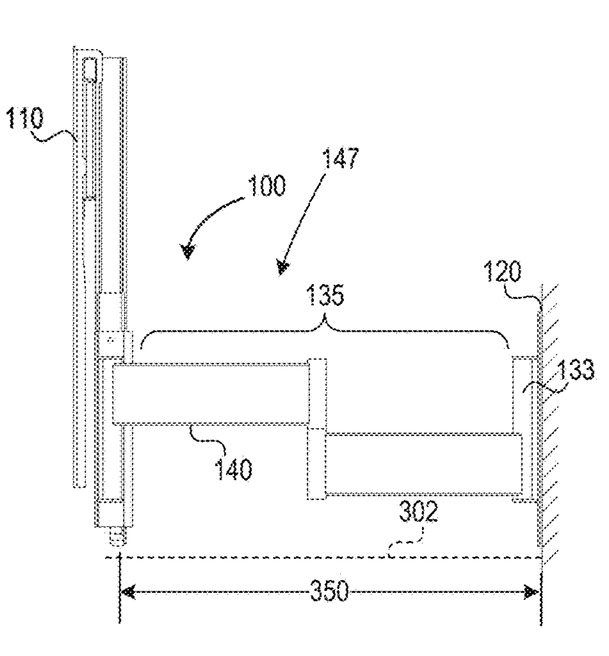
Figure 13:
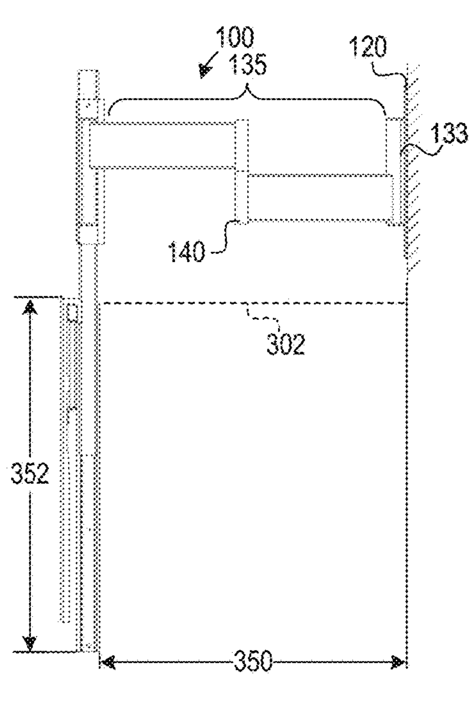

FIGS. 11-13 are side views of the display mount 100 in different configurations. FIG. 11 shows the display mount 100 in a stowed configuration. FIG. 12 shows the display mount 100 configured to hold a television at a forward raised position. FIG. 13 shows the display mount 100 configured to hold the television at the forward lowered position. Referring now to FIG. 11, to avoid contact with an object directly underneath the display mount 100, the television can be manually moved along a desired path, such as one of paths 310, 320, 330, 342. The display mount 100 can include one or more release mechanisms, latches, other components to limit movement, paths, etc. The display mount 100 can hold the television above a reference plane or height 302, illustrated as a horizontal plane directly below the wall mounting portion 133. The television and components of the display mount 100 can be kept spaced apart from the reference plane or height 302.

Although FIG. 11 shows examples paths 310, 320, 330, 342, the television can be moved along other paths. The example horizontal/vertical path 310 shows two-stage motion in which the television is moved in a substantially horizontal direction from a retracted position to a forward position. The terms “substantially horizontal” generally refers to directions within about +/−2 degrees of horizontal, for example, within about +/−1 degree of horizontal such as within about +/−0.8 degrees of horizontal. Substantially horizontal also refers to ranges of small angles from horizontal, for example, angles between about 0.1 degrees and 1.8 degrees from horizontal, such as angles between about 0.2 degrees and about 1.2 degrees, or, for example, angles between about 0.3 degrees and about 0.8 degrees. The term “substantially vertical” generally refers to directions within about +/−2 degrees of vertical, for example, within about +/−1 degree of vertical, such as within about +/−0.8 degrees of vertical. For example, the television can be moved sequentially substantially horizontally (e.g., 1 ft, 2 ft, 3 ft, etc.) and then substantially vertically (e.g., 1 ft, 2 ft, 3 ft, etc.). The total distance of travel can be, for example, 2 ft, 3 ft, 4 ft, 5 ft, 6 ft, 7 ft, 8 ft, etc. The distance of the segments of travel and total travel can be selected based on desired television positioning. The television can be moved along other paths, such as path 320 or linear path 330. In some embodiments, the display mount 100 can move the television in a first direction in a first plane and a second direction substantially parallel to a second plane that is orthogonal to the first plane. In some embodiments, the television can be moved downwardly and then forwardly along the path 342. The direction of movement of the television can be aligned with (e.g., parallel to) the user-applied force. The television can be moved to other positions within the range of motion.

FIG. 12 shows the extender assembly 135 in a fully deployed or extended configuration. The articulating arms 140 can be generally straight to limit additional forward travel. When the vertical positioner mechanism 147 lowers the television, the articulating arms 140 can be automatically locked to inhibit forward/rearward motion. This can prevent contact with an object underneath the display mount 100 when the television is partially or fully lowered. In other embodiments, the articulating arms 140 are freely rotatable, including when the television is raised or lowered.

As shown in FIG. 13, after the vertical positioner mechanism 147 has been moved a distance 350 (e.g., 1 ft, 2 ft, 3 ft, etc.) from the wall 120, the television can be lowered. For example, the television can be moved along a vertical line of action. The display mount 100 can include an optional latch mechanism that requires that the television be moved to the forward position (e.g., a position set by the user) before the vertical positioner mechanism 147 is unlocked. This prevents the television from being pulled downward when the television is directly above an object next to the wall. As the television is lowered a distance 352 (FIG. 13), the horizontal position of the television can be maintained (e.g., a distance

350 can be maintained) to keep the television or display mount 100 from contacting any objects underneath the wall mounting portion 133. The distance 352 can be 6 in, 1 ft, 2 ft, 3 ft, or other suitable distance. In some embodiments, the vertical positioner mechanism 147 can allow both vertical movement above and vertical movement below the wall mounting portion 133.

Television mounts can have counterbalance assemblies selected based on the size and mass of the television to be mounted. Example counterbalance assemblies are discussed in connection with FIGS. 14-22. Example counterbalance assemblies can include one or more mechanical compression springs, extension springs, gas springs, gas pistons, actuators, motors, biasing elements (e.g., rubber bands, flexible tethers, or the like). The number, configuration, and position of the biasing components can be selected to achieve a desired counterbalancing. Example counterbalance assemblies are discussed below.

Figures 14, 15, 16:
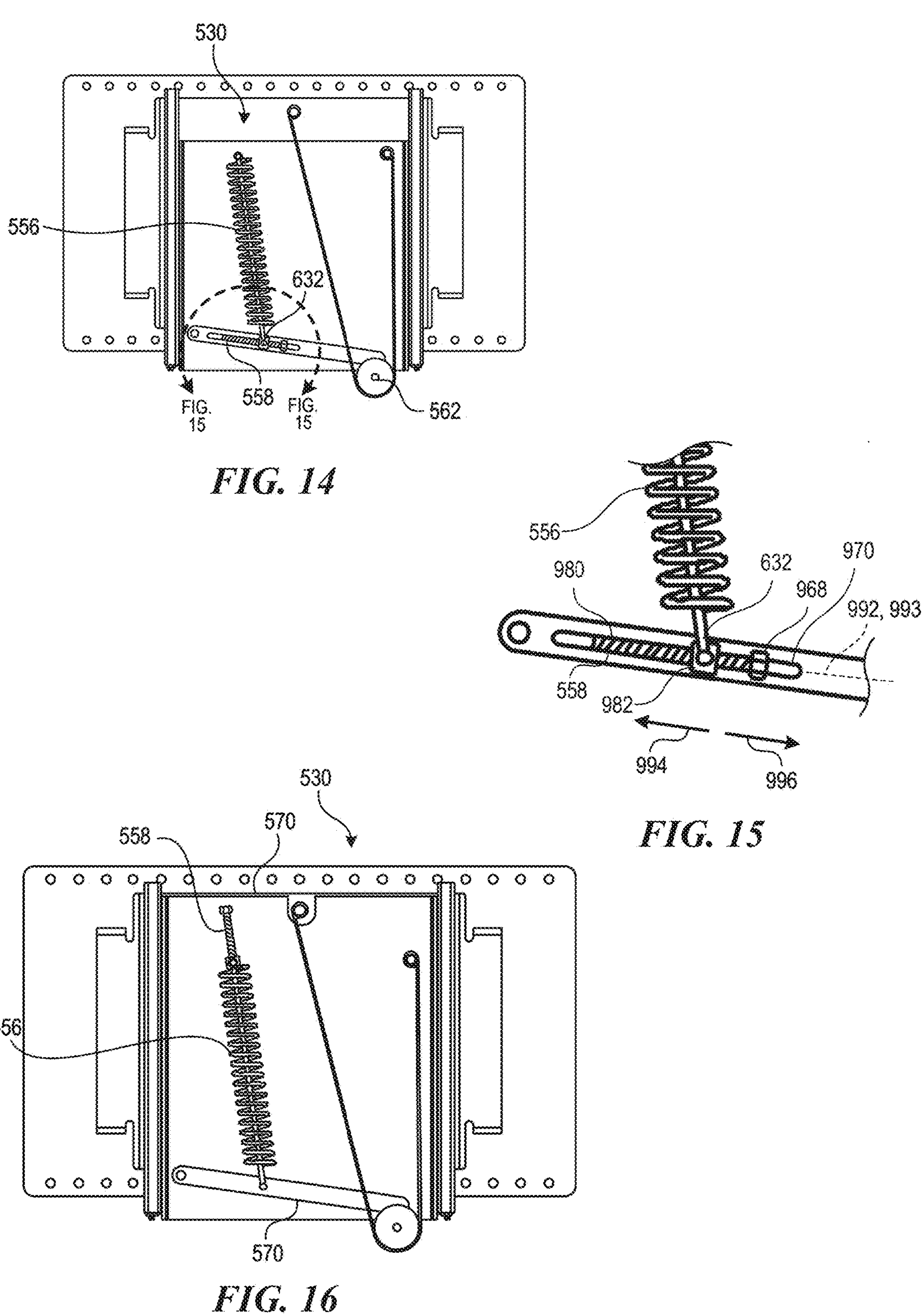
FIG. 14 is a front view of a lever-pulley counterbalance assembly in accordance with an embodiment of the technology.
FIG. 15 is a detailed view of components of the lever-pulley counterbalance assembly of FIG. 14.
FIG. 16 is a front view of a lever-pulley counterbalance assembly in accordance with another embodiment of the technology.

Referring now to FIGS. 14 and 15, the adjuster 558 is pivotally coupled to an end 967 of the biasing device 556 and includes a threaded rod 970 and adjuster element 968 (e.g., a bolt head, a rotatable member, etc.). Referring to FIG. 15, the threaded rod 970 can have external threads 980 that engage internal threads of a carriage or slider 982 connected to the end 967 of the biasing device 556. The adjuster element 968 can be rotated about an axis rotation 992 to translate the slider 982 along a longitudinal axis 993 of the pulley arm 560, as indicated by arrows 994,996. For example, the adjuster element 968 can be rotated to move (indicated by arrow 996) the slider 982 towards the movable pulley 562 (FIG. 15) to extend the biasing device 556. The adjuster element 968 can be rotated in the opposite direction to move (indicated by arrow 994) to contract the biasing device 556. This allows the user to set counterbalancing for different TVs.

The counterbalance assembly 530 that allows a user to effortlessly move the television to different vertical positions but prevents or inhibits movement of the television when the user does not apply a force. The television can be moved using a force that is less than a threshold force. The threshold force can be about 1 $lb_f$, 2 $lb_f$, 3 $lb_f$, 5 $lb_f$, 10 $lb_f$, 20 $lb_f$, 30 $lb_f$, or 40 $lb_f$, as well as any other suitable threshold force. An adjuster 558 can be rotated to gradually increase or decrease the counterbalancing force, thereby adjusting the threshold force by at least 1 $lb_f$, 2 $lb_f$, 3 $lb_f$, 5 $lb_f$, 10 $lb_f$, or 20 $lb_f$. The counterbalancing mechanism 247 can be adjusted to provide a desired constant or variable counterbalancing force. The display mount 100 can provide a generally constant counterbalancing force for most or substantially all of the vertical travel of the television. The percent variation of the counterbalancing force during operation can be at or below a threshold level. For example, the variation of the counterbalancing force can be equal to or less than 1%, 2%, 5%, or 10% for a predefined amount of television travel (e.g., at least 70%, 80%, 90%, 95%, or 100% of travel). In some embodiments, the percent change, if any, of the counterbalancing force can be equal to or less than 1%, 2%, 5%, 10%, or 20% for a predefined amount of television travel (e.g., at least 50%, 60%, 70%, 80%, 95%, or 100% of travel, such as 0.2 m, 0.3 m, 0.4 m, 0.5 m, 0.7 m, 0.8 m, 1 m, 2 m, 3 m, etc.). In other embodiments, the pulley system can provide a varying counterbalancing force to, for example, slow movement of the television near the end of travel. The increase or decrease of counterbalancing forces can be set based on the weight of the television, range of motion, and desired feel.

FIG. 16 shows the adjuster 558 connecting the biasing device 556 to the vertical moving plate 570. The biasing device 556 can be fixedly coupled to the pully arm 560. The configuration and position of the adjuster 558 can be selected based on the desired counterbalance adjustability.

Figure 17:
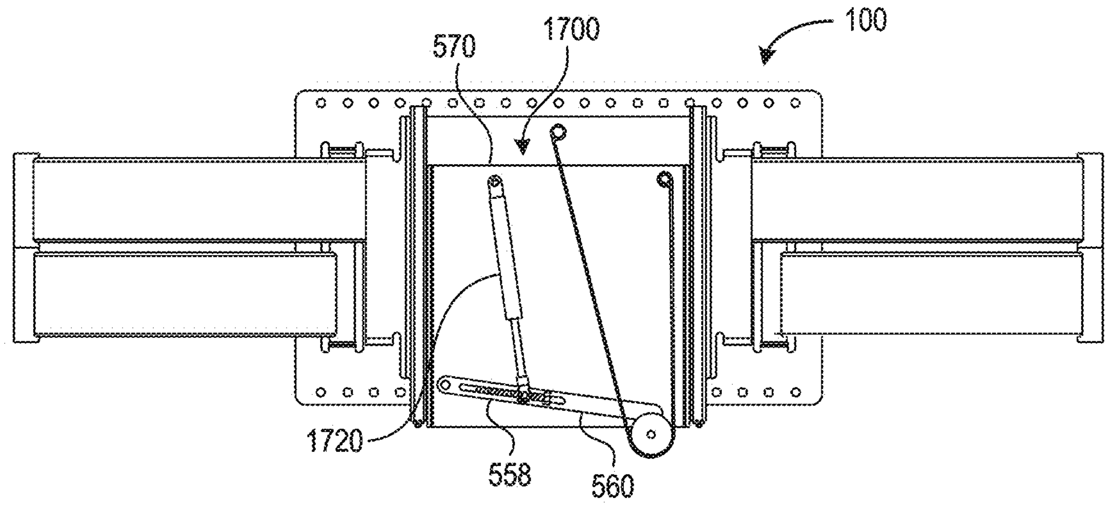
FIG. 17 is a front view of a lever-pulley counterbalance assembly with a gas spring in accordance with an embodiment of the technology.

FIG. 17 is a front view of a counterbalance assembly 1700 in accordance with an embodiment of the technology. The other components of the display mount 100 are similar to the components discussed in connection with FIGS. 1-16. Referring now to FIG. 17, the counterbalance assembly 1700 includes one or more gas springs or pistons 1720 pivotally coupled to the plate 570 and the pulley arm 560. In some embodiments, the gas spring or piston 1720 is fixedly coupled to the pulley arm 560. In some adjustable embodiments, the pulley arm 560 can include an adjuster for repositioning gas springs or pistons 1720. In some embodiments, multiple gas pistons can be connected to the vertical moving plate 570 and the pulley arm 560. The number, orientation, and configuration of the gas springs or pistons 1720 can be selected based on the desired counterbalancing.

Figure 18:
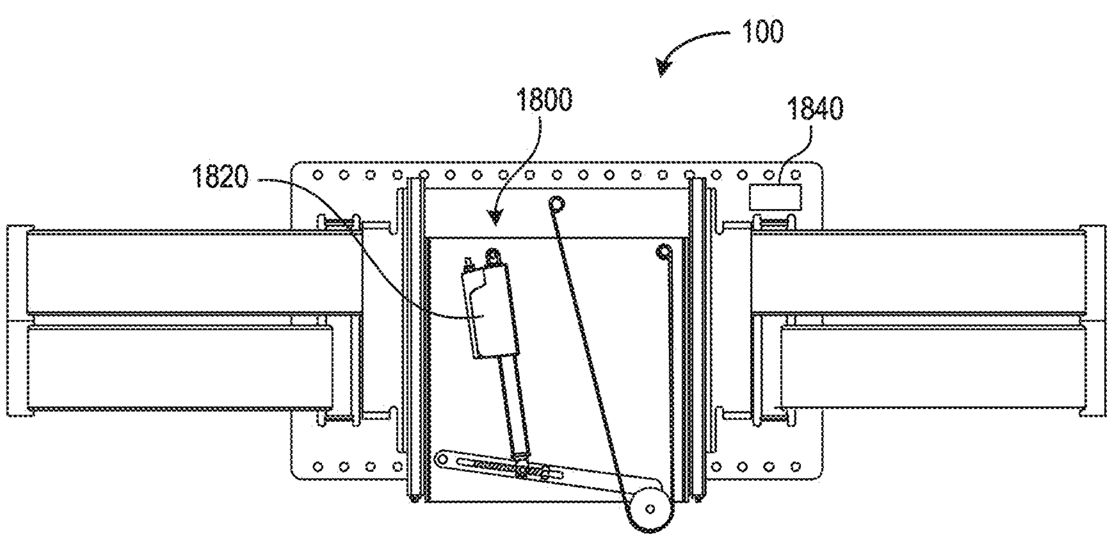
FIG. 18 is a front view of a lever-pulley counterbalance assembly with an actuator in accordance with an embodiment of the technology.

FIG. 18 is a front view of a counterbalance assembly 1800 with an actuator 1820 (e.g., an electronic actuator) in accordance with an embodiment of the technology. Some components of the display mount 100 are similar to the components discussed in connection with FIGS. 1-16. The actuator 1820 can be controlled by one or more controllers that receive commands from a user via touchpad, remote control, or other input. The actuator 1820 can be powered by a power source, including an AC power outlet, battery, or the like.

Figure 19:
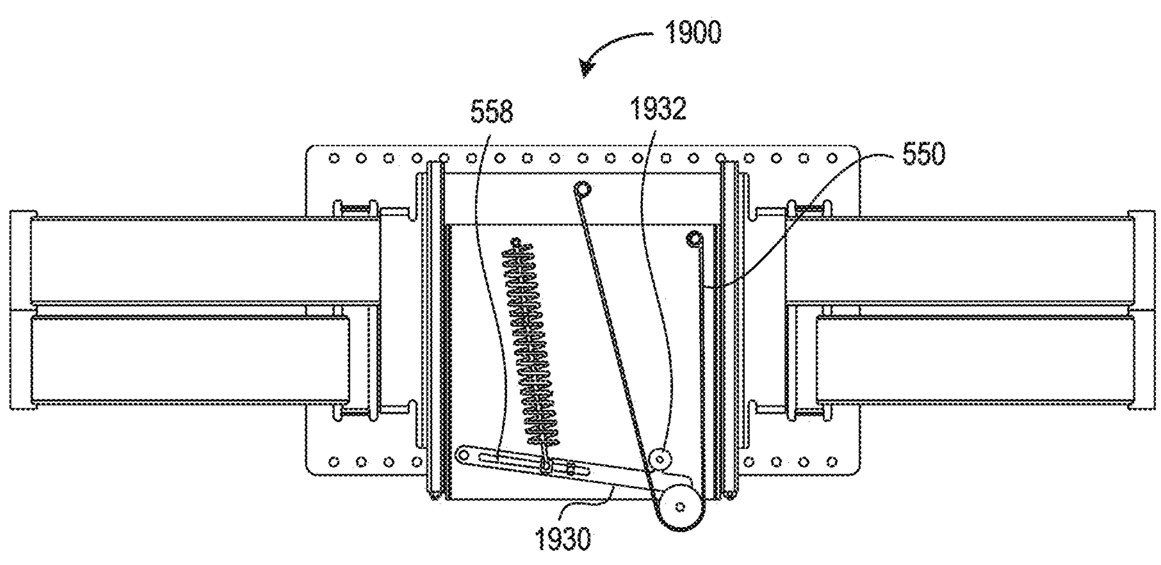
FIG. 19 is a front view of a lever-idler pulley counterbalance assembly in accordance with an embodiment of the technology.
Figure 20:
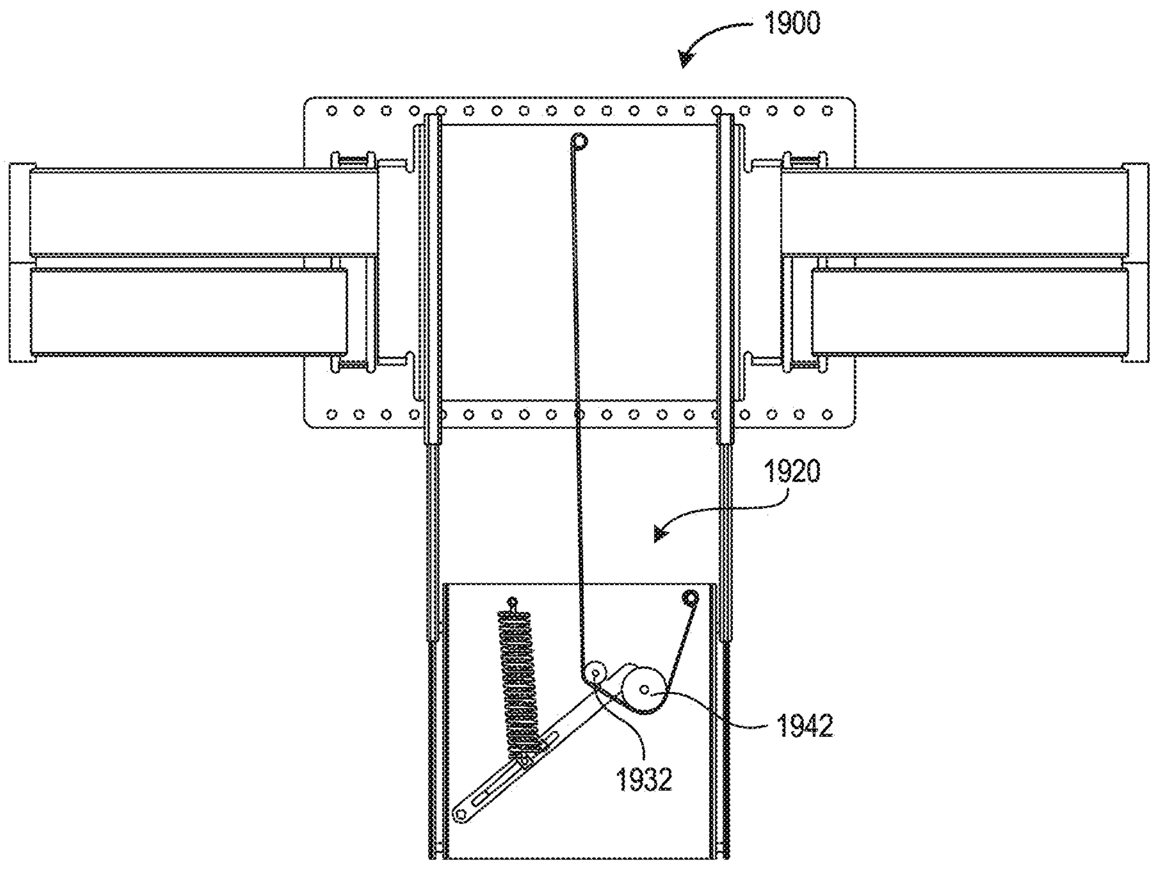
FIG. 20 is a front view of the lever-idler pulley counterbalance assembly of FIG. 19 configured to hold a television in a lowered position.

FIG. 19 is a front view of an idler-pulley counterbalance assembly 1900 in accordance with an embodiment of the technology. Some components of the counterbalance assembly 1900 are similar to the components discussed in connection with FIGS. 1-16. The counterbalance assembly 1900 can include a vertical moving plate 1920, a pulley arm 1930 pivotably coupled thereto, and an idler pulley 1932 mount thereon that contacts the connector 550, as shown in FIG. 20. In some embodiments, the idler pulley 1932 engages the connector 550 during only a portion of the pulley arm movement. The pulling angle on the connector 550 can change, thereby altering the counterbalancing force as the vertical moving plate 1920 moves vertically. In some embodiments, this provides for variable counterbalancing to more closely match the counterbalancing force to the weight of the television. An adjuster 558 can also be used to adjust the counterbalancing force. The location, size, and configuration of the idler pulley 1932 can be selected based on the desired counterbalancing force. For example, the idler pulley 1932 can be moved away from the adjacent portion (see FIG. 19) of the connector 550 to increase the amount of movement in which the idler pulley 1932 does not engage the connector 550. The idler pulley 1932 can be moved closer to the adjacent portion of the connector 550 to increase the contact during the movement. As the television is lowered, the pulley wheel 1942 and the idler pulley 1932 can roll along the connector 550, as shown in FIG. 20. The idler pulley 1932 can be rotatable relative to the pulley arm 1930 to allow for smooth travel. The connector 550 can be a belt with teeth or engaging members that engage or enmesh with exterior features (e.g., teeth, protrusions, etc.) of the wheel 1942 or idler pulley 1932.

Figure 21:
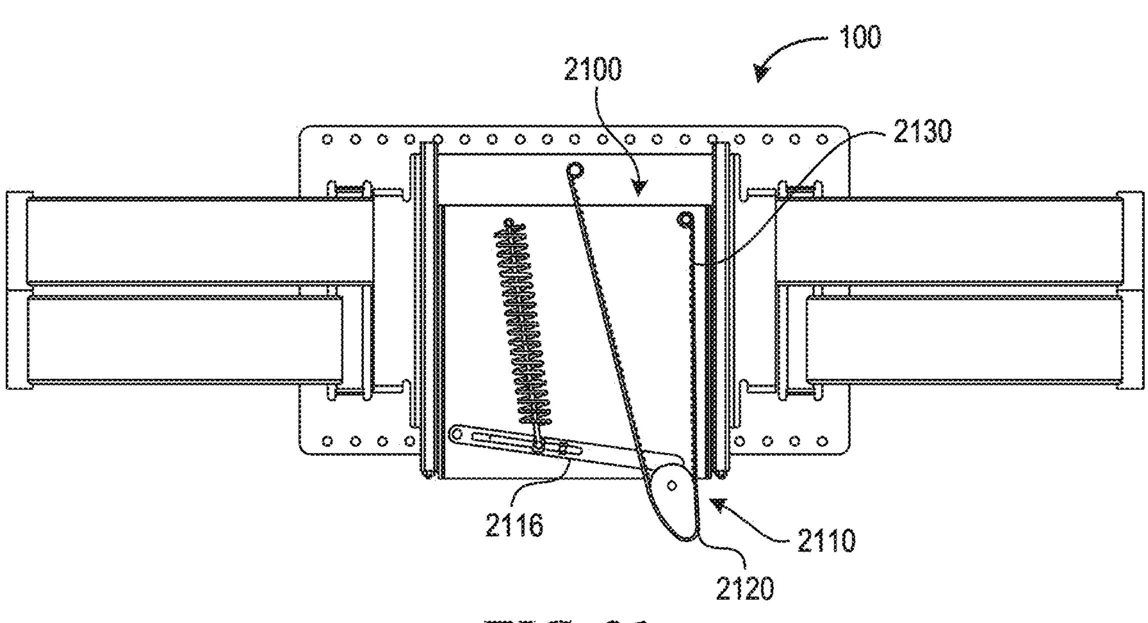
FIG. 21 is a front view of a lever-cam pulley counterbalance assembly in accordance with an embodiment of the technology.
Figure 22:
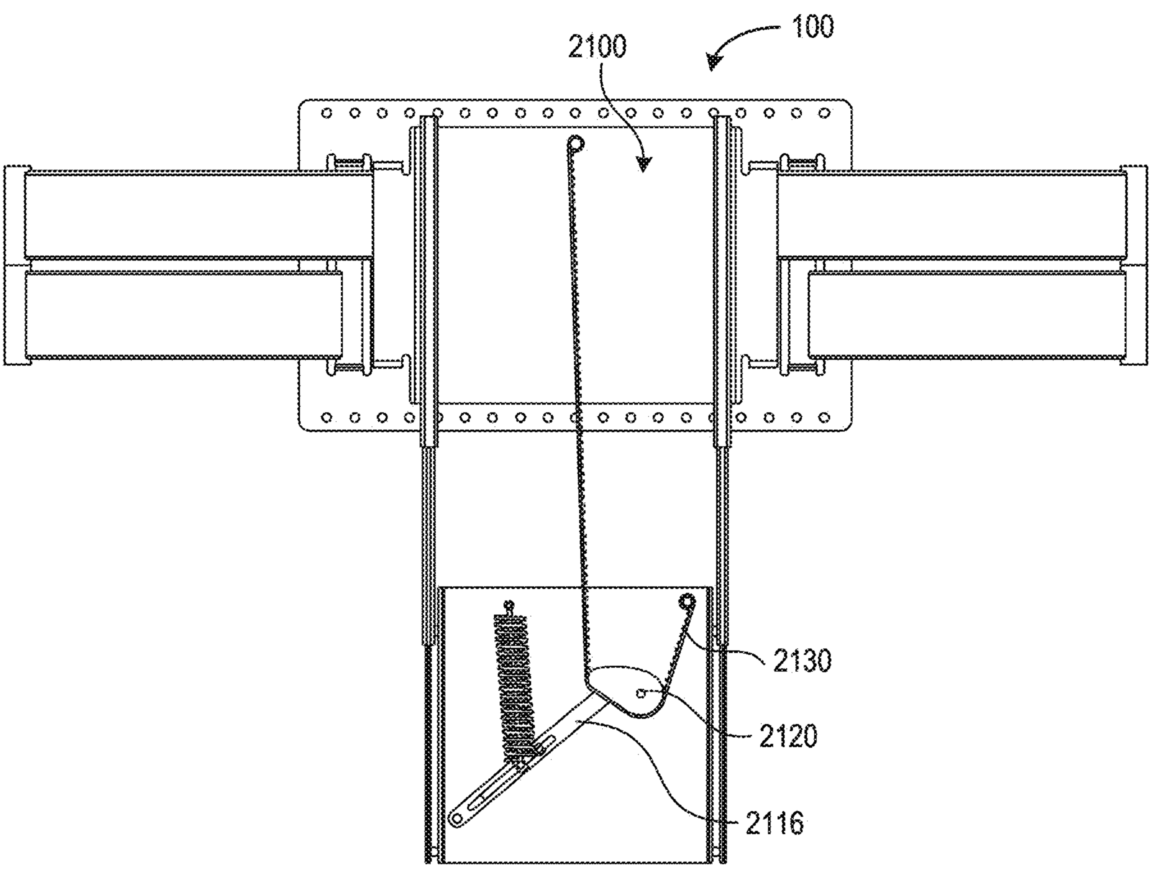
FIG. 22 is a front view of the lever-cam pulley counterbalance assembly of FIG. 21 configured to hold a television in a lowered position.

FIG. 21 is a front view of a counterbalance assembly 2100 with a cam-pulley system 2110 in accordance with an embodiment of the technology. FIG. 22 is a front view of the counterbalance assembly of FIG. 21. Some components of the display mount 100 are similar to the components discussed in connection with FIGS. 1-16. The cam-pulley system 2110 can include a pulley arm 2116 that includes a rotatable cam 2120. The counterbalance assembly 2100 can include a connector in the form of a belt 2130 (e.g., a timing belt) with teeth that engage the cam 2120. For example, the cam 2120 can include teeth that enmesh the teeth of the belt 2130 to determine the position of the cam 2120 and change the angle that the belt 2130 pulls, thereby altering the counterbalancing force as the television moves vertically. This creates a varying counterbalancing force that can match the weight of the television. For example, as shown in FIG. 22, the cam 2120 can be rotated counterclockwise as the television is lowered. The change in geometry of the belt 2130 along the cam 2120 provides for balancing force adjustment. The configuration and features of the cam can be selected based on the desired configuration of the connector and motion.

Figure 23:
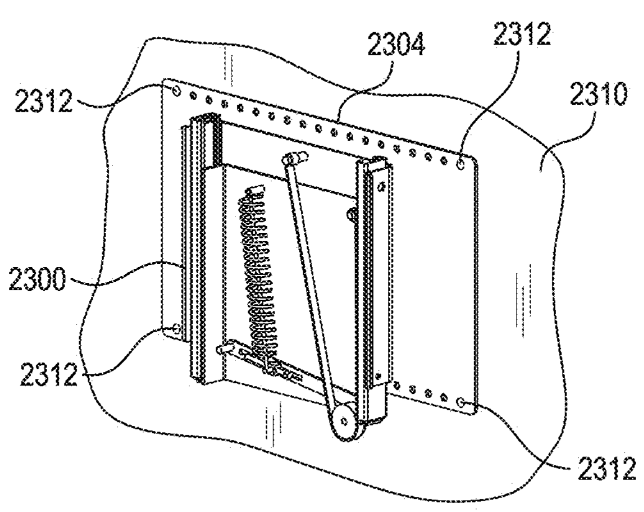
FIG. 23 is an isometric view of a vertical wall slider in a raised configuration in accordance with an embodiment of the technology.
Figure 24:
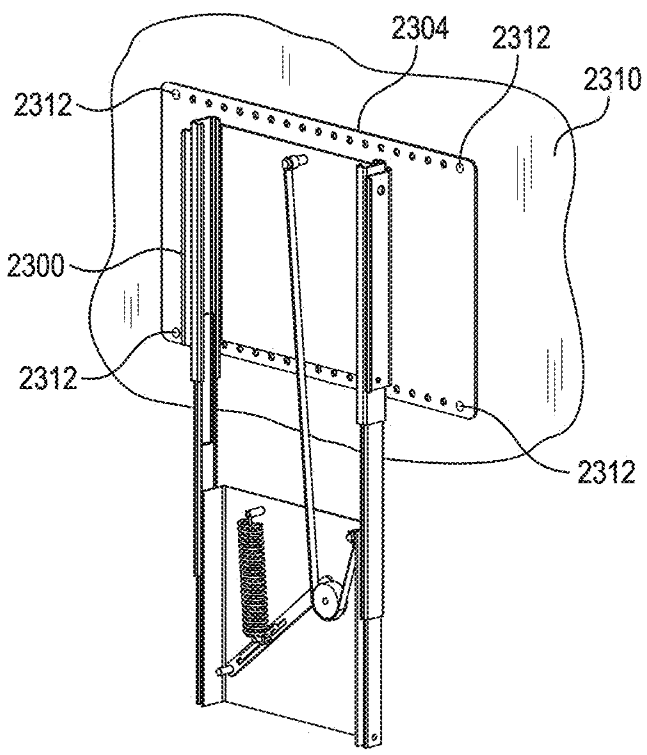
FIG. 24 is an isometric view of the vertical wall slider of FIG. 23 in a lowered configuration.

FIG. 23 is an isometric view of a vertical wall slider 2300 in a raised configuration in accordance with an embodiment of the technology. FIG. 24 is a front view of the vertical wall slider 2300 in a lowered configuration. The vertical wall slider 2300 is connected to a wall plate 2304. The wall plate 2304 can be coupled to a wall 2310 via one or more fasteners 2312. The connection between the wall plate 2304 and the vertical wall slider 2300 can be selected based on the configuration of the mount. By eliminating the horizontal travel, the television can be moved vertically closely along the wall 2310.

Figure 25:
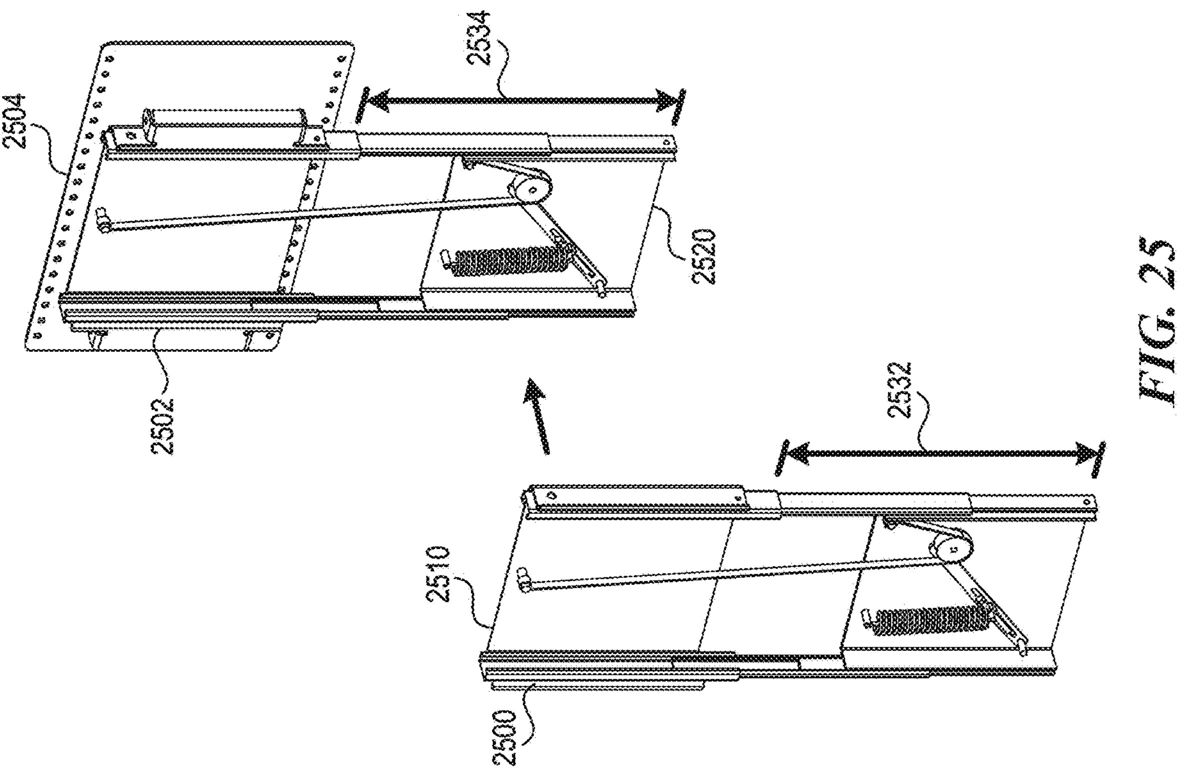
FIG. 25 shows a vertical wall slider positioned to be installed on another vertical wall slider.

FIG. 25 shows a vertical wall slider 2500 positioned to be installed on another vertical wall slider 2502. The vertical wall slider 2500 can be coupled to a TV bracket (not shown). The two vertical wall sliders 2500, 2502 can double the length of vertical travel. The vertical wall slider 2500 can include a vertical moving plate 2510 that can couple to a vertical moving plate 2520 of the wall slider 2502. For example, one or more fasteners, welding, or other attachments can fixedly or removably couple together the wall plates 2510, 2520.

Figure 26:
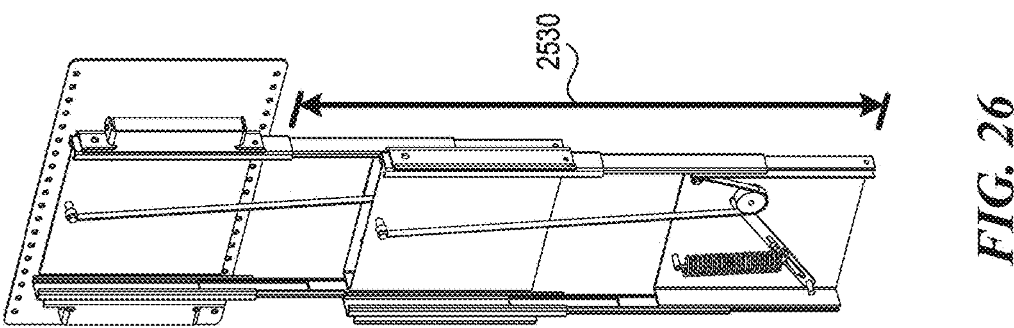
FIG. 26 shows the two vertical wall sliders of FIG. 25 coupled together.

FIG. 26 shows the two vertical wall sliders of FIG. 23 coupled together. As shown, the length of travel 2530 (FIG. 26) is generally equal to the length of travel 2532 (FIG. 25) of the vertical wall slider 2500 plus the length of travel 2534 of the vertical wall slider 2500. Any number of vertical wall sliders can be coupled together. Additionally, the vertical wall sliders can travel different lengths. This allows for customization for deployment.

Figure 27:
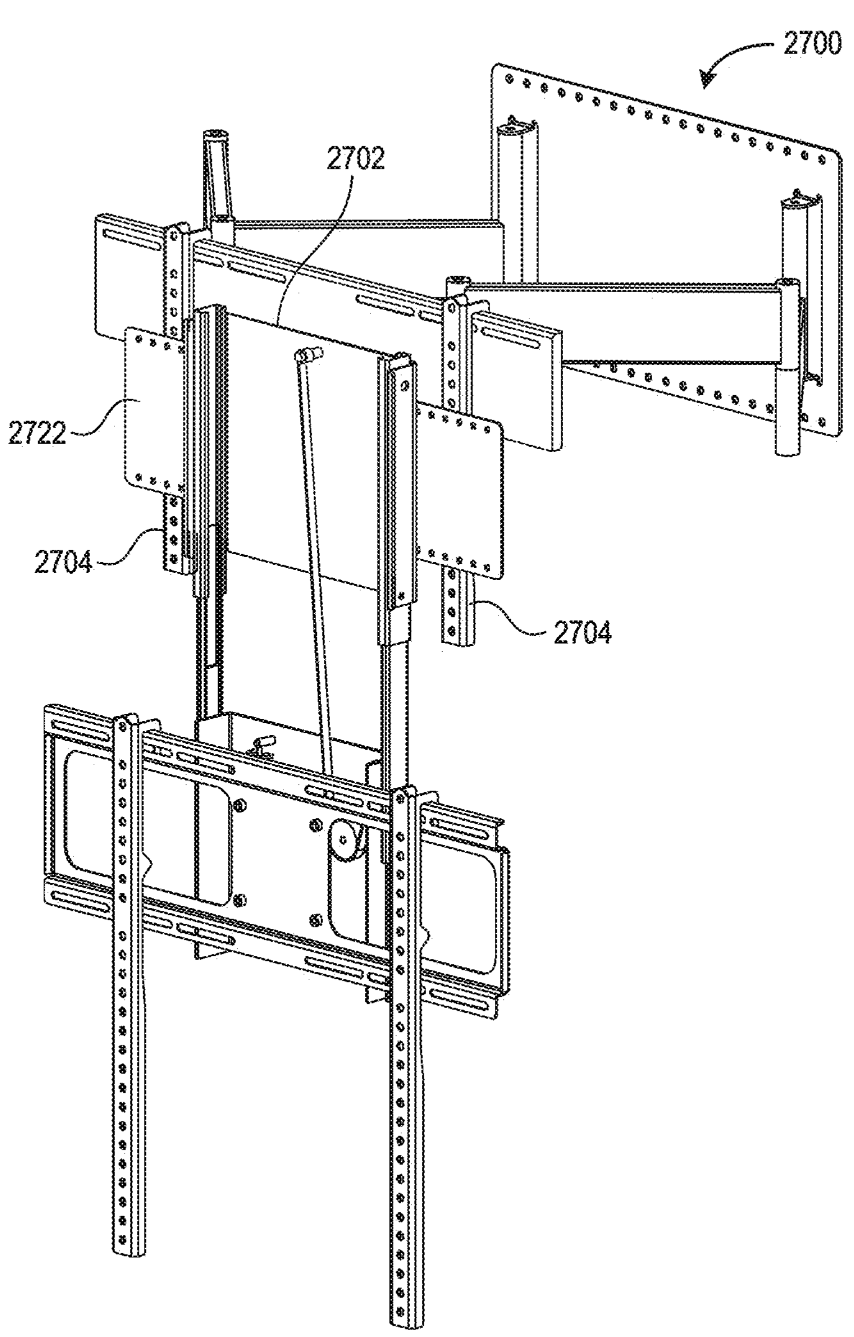
FIG. 27 shows a display mount having a vertical wall slider mounted on another mount in accordance with an embodiment of the technology.

FIG. 27 shows a mount 2700 including a vertical wall slider 2702 mounted to vertical rails 2704 in accordance with an embodiment of the technology. An adaptor plate 2722 can be used to couple the vertical wall slider 2702 to rails 2704. This allows for universal mounting to a wide range of mounting components.

Figure 28:
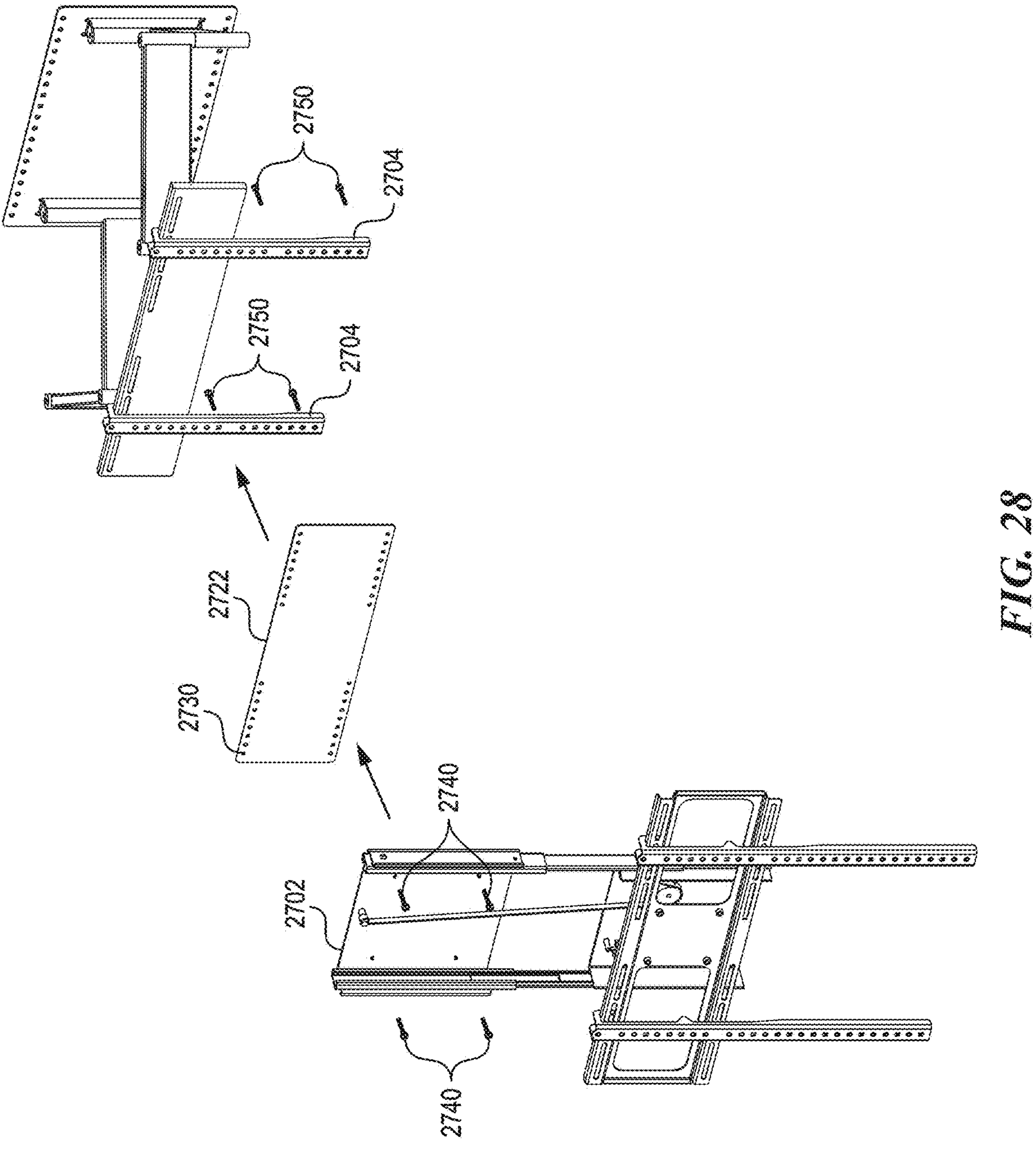
FIG. 28 is an exploded isometric view of components of the display mount of FIG. 27.

FIG. 28 shows an exploded view of the mount 2700 of FIG. 27. The adaptor plate 2722 can include a plurality of receiving features 2730 (one receiving feature labeled) configured to receive fasteners to couple the adaptor plate 2722 to the rails 2704 and additional fasteners coupling the adaptor plate 2722 to the vertical wall slider 2702. In some embodiments, fasteners can pass through openings in the wall plate 2720 and into the receiving features 2730. The number of fasteners, configuration of the fasteners, and position of the adaptor plate 2722 can be adjusted for positioning the TV.

Figure 29:
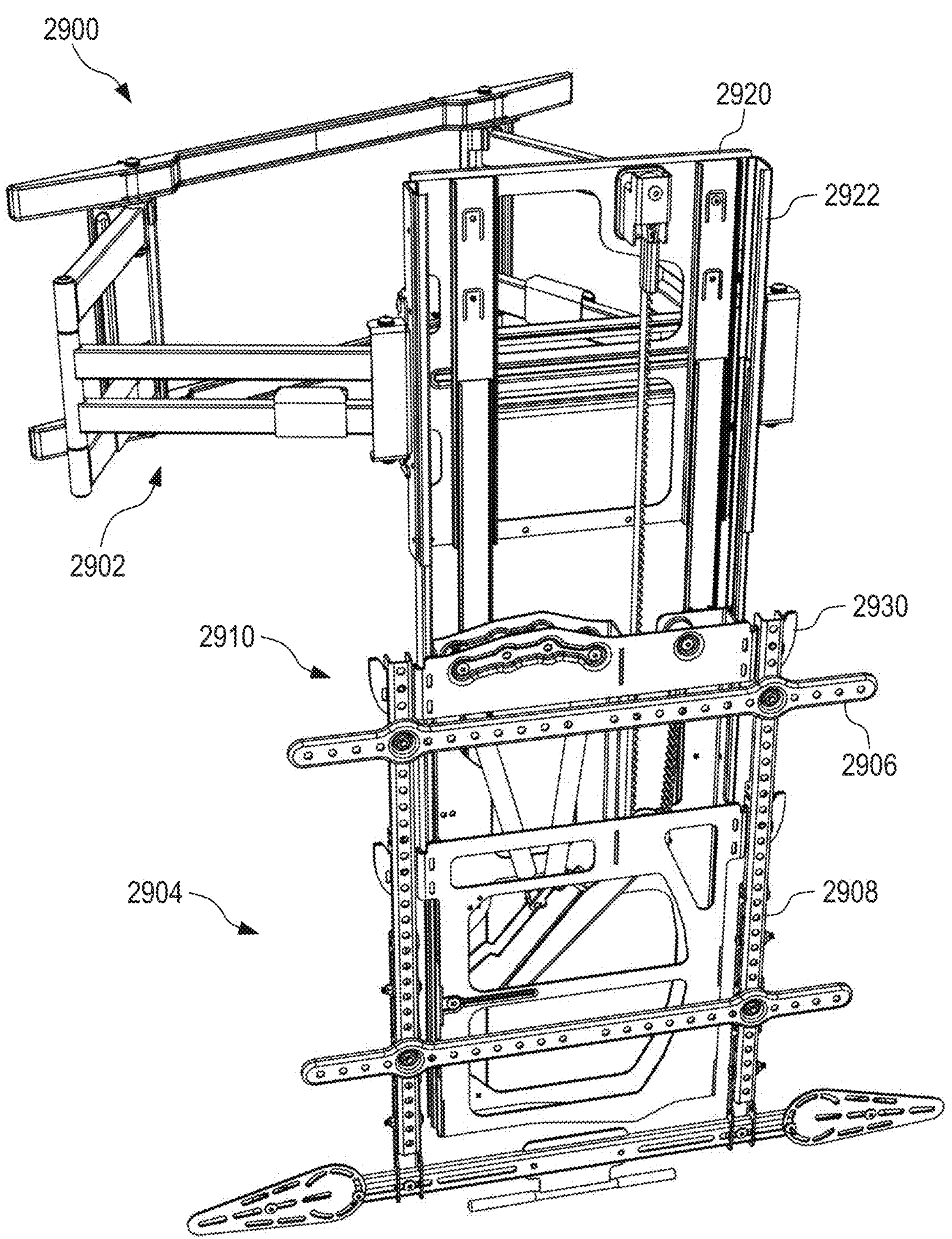
FIG. 29 is an isometric view of a multidirectional display mount in accordance with another embodiment of the technology.

FIG. 29 is an isometric view of a multidirectional display mount 2900 in accordance with another embodiment of the technology. Some components of the multidirectional display mount 2900 are similar to the components discussed in connection with FIGS. 1-28. The multidirectional display mount 2900 can include an extender assembly 2902, a lever-pulley counterbalance assembly 2910 ("the assembly 2910"), and a television bracket 2904. The extender assembly 2902 can be mounted to a wall (e.g., the wall 120 of FIGS. 1-3), the assembly 2910 can be mounted to the extender assembly 2902, and the television bracket 2904 can be mounted to the assembly 2910.

The extender assembly 2902 can be an example of the extender assembly 135 (FIG. 5), and can function similarly to move the assembly 2910 (and thus the television bracket 2904 and the television mounted thereon) away (e.g., horizontally or laterally away) from the wall at various angles. The television bracket 2904 can be an example of the television bracket 500 (FIG. 5), and can include, among other components, vertical braces 2906 and horizontal braces 2908 to support, for example, a television, a speaker, a soundbar, lighting, etc. thereon.

The assembly 2910 can include a vertical fixed frame or plate 2920 and a vertical moving frame or plate 2930 operably coupled to the vertical fixed plate 2920. The vertical fixed plate 2920 can be coupled to the extender assembly 2902, and the television bracket 2904 can be coupled to the vertical moving plate 2930. As discussed in further detail below with reference to FIGS. 30 and 31, the vertical moving plate 2930 can be moved (e.g., slid) vertically along vertical rails 2922 on the vertical fixed plate 2920 to raise or lower the television and/or other devices supported thereon. In some embodiments, the vertical moving plate 2930 is moved relative to the vertical fixed plate 2920 via a telescoping assembly (e.g., the telescoping assembly 260 of FIG. 10).

Figure 31:
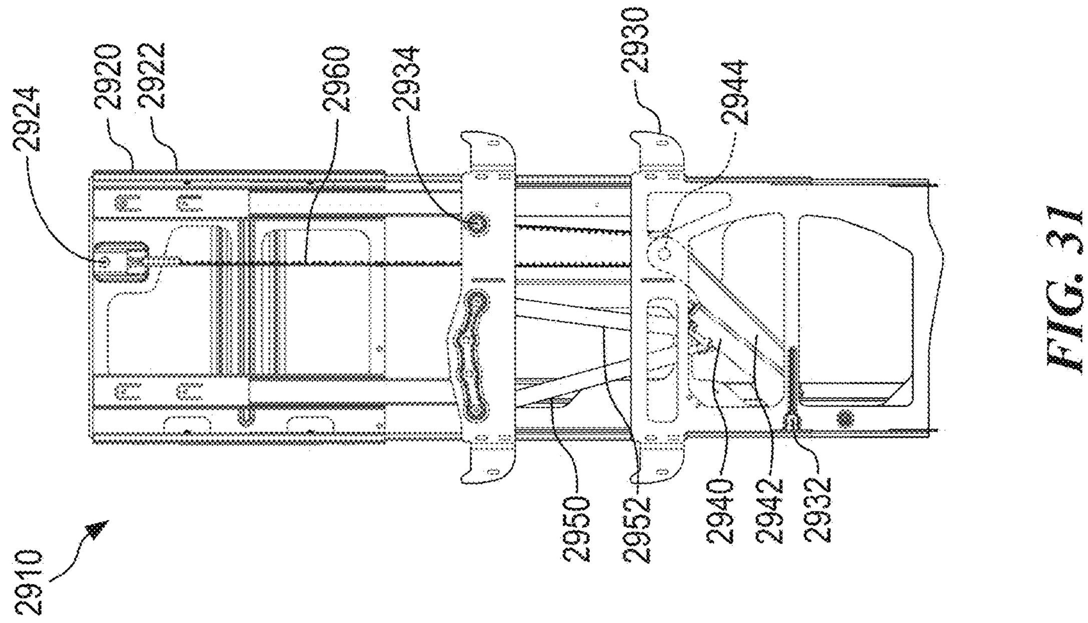
FIG. 31 is a front view of the lever-pulley counterbalance assembly of FIG. 30 in a lowered position.
Figure 30:
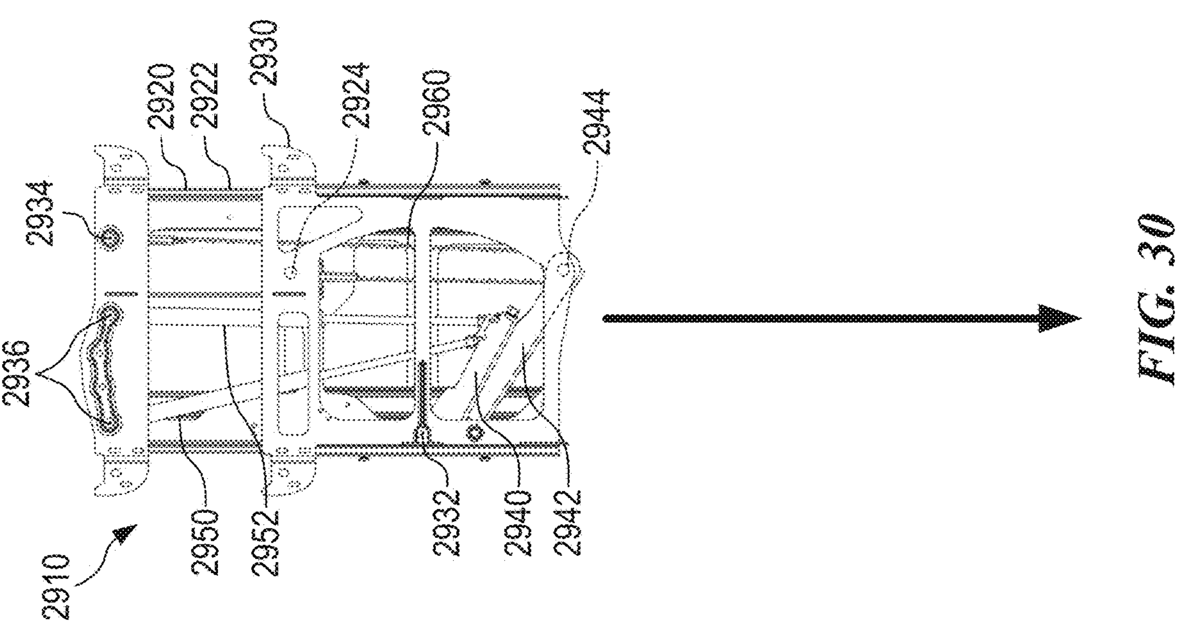
FIG. 30 is a front view of a lever-pulley counterbalance assembly in a raised position in accordance with an embodiment of the technology.

FIGS. 30 and 31 are front views of the assembly 2910 in a raised position and in a lower position, respectively. Referring to FIGS. 30 and 31 together, the assembly 2910 can additionally include a first pulley arm 2940, a second pulley arm 2942, a pulley 2944 (shown partially in phantom lines), a first biasing element 2950, a second biasing element 2952, and a connector 2960. Some components of the assembly 2910 are similar to the components discussed in connection with FIGS. 1-28.

The first and second pulley arms 2940, 2942 can be coupled together and can rotate about pivot 2932 on the vertical moving plate 2930. In some embodiments, the first and second pulley arms 2940, 2942 are integrally formed. The pulley 2944 can be rotatably coupled to a distal end of the second pulley arm 2942 opposite the pivot 2932. Each of the first and second biasing elements 2950, 2952 can be pivotably coupled between a distal end of the first pulley arm 2940 and one of a plurality of connection points or pivots 2936 (four are illustrated in FIGS. 30 and 31) on the vertical moving plate 2930. The first and second biasing elements 2950, 2952 can be configured to bias the assembly 2910 toward the raised position (FIG. 30). In some embodiments, the first and second biasing elements 2950, 2952 are oriented to extend at non-parallel angles relative to one another, as shown. Depending on which pivot 2936 the first and second biasing elements 2950, 2952 are coupled, the angles and thus the biasing parameters of the first and second biasing elements 2950, 2952 can be varied. In the illustrated embodiment, the first and second biasing elements 2950, 2952 comprise gas springs.

The connector 2960 can be coupled to extend between a pivot 2924 (shown in phantom lines) on the vertical fixed plate 2920 and a pivot 2934 on the vertical moving plate 2930. In particular, the connector 2960 loops or extends around the pulley 2944 and thereby supports the vertical moving plate 2930 on the vertical fixed plate 2920. In some embodiments, the connector 2960 comprises a belt with teeth (as shown) and/or other engagement features that engage or enmesh with exterior features (e.g., teeth, protrusions) of the pulley 2944.

Referring to FIG. 30, when the assembly 2910 is in the raised position, the vertical moving plate 2930 substantially overlaps the vertical fixed plate 2920 from the front view, as shown. Also, the first and second biasing elements 2950, 2952 are in extended states. Furthermore, the first and second pulley arms 2940, 2942 are angled downward from the pivot 2932 due to the first and second biasing elements 2950, 2952 being in the extended states. In operation, a user can manually pull the vertical moving plate 2930 downward, as indicated by the arrow in FIG. 30, to configure the assembly 2910 from the raised position to the lowered position.

Referring to FIG. 31, when the assembly 2910 is in the lowered position, the vertical moving plate 2930 has moved down such that the vertical moving plate 2930 does not substantially overlap the vertical fixed plate 2920 from the front view, as shown. In particular, the vertical fixed plate 2920 can remain fixed in position (e.g., relative to the extender assembly 2902 of FIG. 29 and/or the wall), as indicated by the same vertical position of the pivot 2924 upon comparing FIGS. 30 and 31, and the vertical moving plate 2930 can move downward along the vertical rails 2922. Also, the first and second biasing elements 2950, 2952 are in contracted states. Furthermore, the first and second pulley arms 2940, 2942 are angled upward from the pivot 2932 due to the first and second biasing elements 2950, 2952 being in the contracted states.

In operation, when the user pulls down on the television, the user-applied force can overcome the biasing force provided by the first and second biasing elements 2950, 2952. As the vertical moving plate 2930 moves downward, the engagement between the pulley 2944 and the connector 2960 causes the first and second pulley arms 2940, 2942 to rotate upwardly and the pulley 2944 to rotate clockwise along the connector 2960 (e.g., by virtue of the engaged teeth). In some embodiments, the pivot 2924 is located closer to the pulley 2944 than the pivot 2934 when the assembly 2910 is in the raised position, and the pivot 2934 is located closer to the pulley 2944 than the pivot 2924 when the assembly 2910 is in the lowered position. The angle of rotation of the first and second pulley arms 2940, 2942 can be equal to or greater than about, for example, 20 degrees, 30 degrees, 40 degrees, 45 degrees, or other angles. The configuration and angle of rotation of the first and second pulley arms 2940, 2942 can be selected based on the desired range of travel. The first and second biasing elements 2950, 2952 are gradually contracted or compressed by the upward rotation of the first and second pulley arms 2940, 2942. When the user pushes the television back upward, the biasing force provided by the first and second biasing elements 2950, 2952 can facilitate the movement, allowing the user to use less force than the weight of the television to configure the assembly 2910 to the raised position.

The mechanical advantage provided by the first and second pulley arms 2940, 2942 and the first and second biasing elements 2950, 2952 allows for a relatively small counterbalance mechanism footprint behind the television while providing a large range of travel of the television. The number, orientation, type, biasing force, and other characteristics of the first and second biasing elements 2950, 2952 can be selected based on desired counterbalancing forces, allowing for customization of the counterbalancing forces. The counterbalancing forces can be further customized by pivotably coupling the first and second biasing elements 2950, 2952 between different ones of the pivots 2936 and/or different points along the length of the first pulley arm 2940. For example, in some embodiments, when configuring the assembly 2910 between the raised and lowered positions, the distance traveled by the pulley 2944 relative to the vertical moving plate 2930 is about half the distance traveled by the vertical moving plate 2930 relative to the vertical fixed plate 2920. In some embodiments, the counterbalancing force applied by the first and second biasing elements 2950, 2952 is twice the weight of the television and the vertical moving plate 2930. The number and locations of the pivots 2936 can be selected based on the desired adjustability. For example, the illustrated four pivots 2936 are spaced apart along an arcuate path. In other embodiments, more or less pivots can be spaced apart along a straight path, curved path, or the like. A user can connect the first and second biasing elements 2950, 2952 to different pivots to change the geometry of the biasing arrangement. In some embodiments, the first and second biasing elements 2950, 2952 (e.g., springs, gas piston, etc.) can be replaced with motorized actuators or other components disclosed herein.

Figure 32:
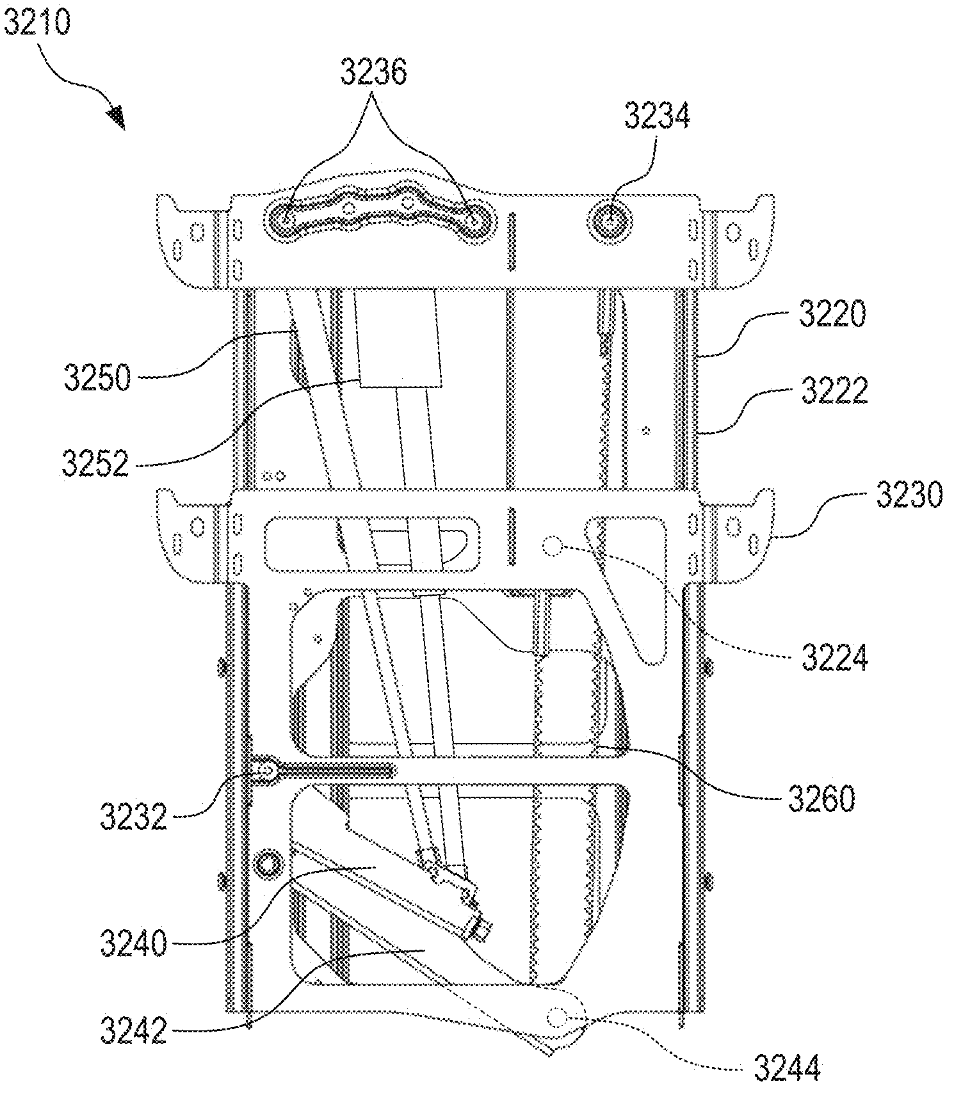
FIG. 32 is a front view of a lever-pulley counterbalance assembly in a raised position in accordance with another embodiment of the technology.

FIG. 32 is a front view of a lever-pulley counterbalance assembly 3210 ("the assembly 3210") in a raised position in accordance with an embodiment of the technology. In some embodiments, the assembly 3210 can replace the assembly 29 10 in the multidirectional display mount 2900 of FIG. 29. Some components of the assembly 3210 are similar to the components discussed in connection with FIGS. 30 and 31. For example, the assembly 3210 can include a vertical fixed plate 3220, a vertical moving plate 3230, a first pulley arm 3240, a second pulley arm 3242, a pulley 3244 (shown partially in phantom lines), a biasing element 3250, and a connector 3260. However, unlike the assembly 2910, the assembly 3210 includes an actuator 3252 (e.g., a linear actuator) instead of, e.g., a second biasing element. Each of the biasing element 3250 and the actuator 3252 can be pivotably coupled between a distal end of the first pulley arm 3240 and one of a plurality of pivots 3236 (four are illustrated in FIG. 32) on the vertical moving plate 3230.

In operation, to lower the television, a user can operate the actuator 3252 to retract and thereby pull on the distal end of the first pulley arm 3240. Thus, the first and second pulley arms 3240, 3242 can rotate upward about the pivot 3232 and the pulley 3244 can rotate clockwise on the connector 3260. To raise the television, the user can operate the actuator 3252 to extend and thereby push on the distal end of the first pulley arm 3240. Thus, the first and second pulley arms 3240, 3242 can rotate downward about the pivot 3232 and the pulley 3244 can rotate counterclockwise on the connector 3260. The biasing element 3250 can reduce the amount of force the actuator 3252 needs to apply to return the assembly 3210 to the raised position. Compared to the assembly 2910, by including the actuator 3252, the assembly 3210 comprises a motorized lifting system that may not require manual force by a user to lower or raise the television mounted thereon.

Figure 33:
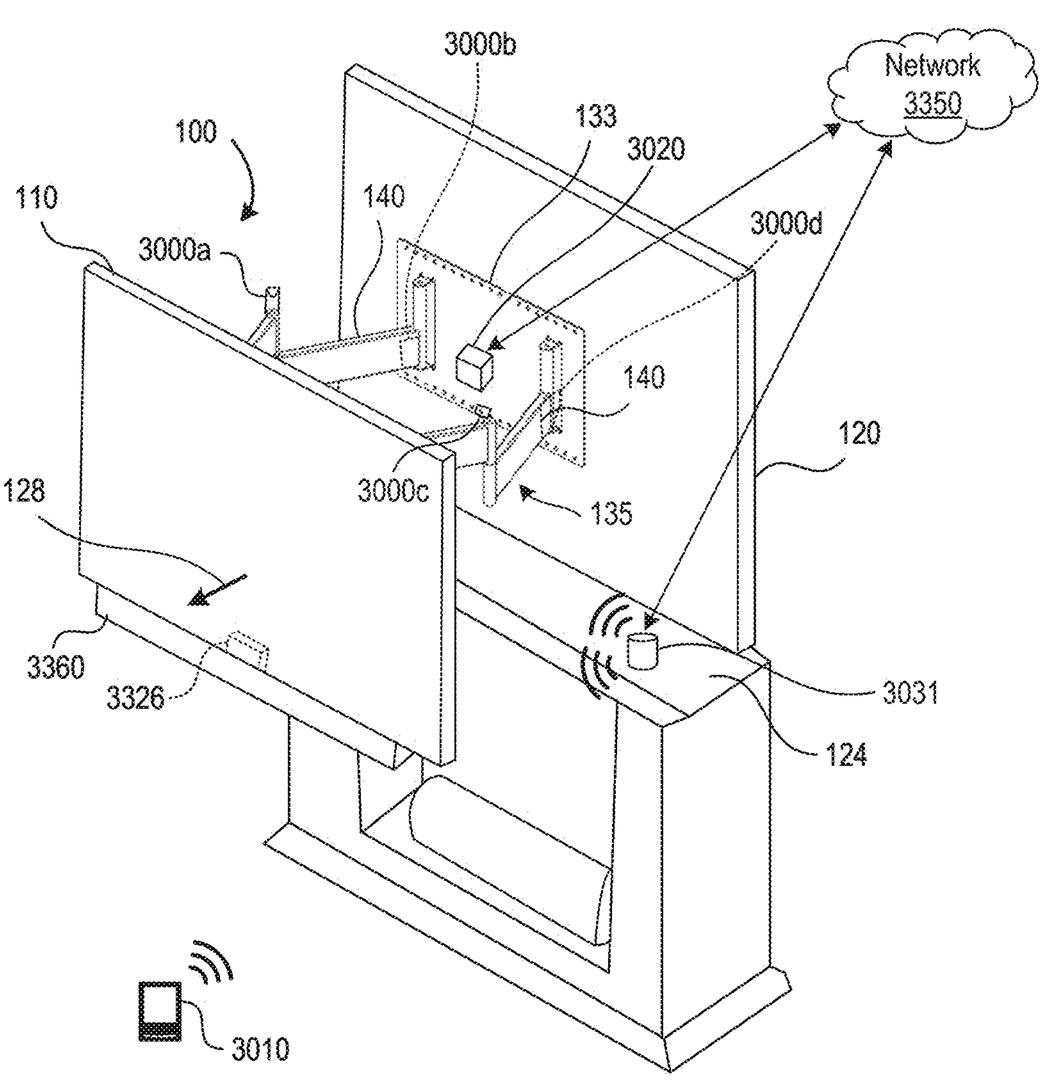
FIG. 33 shows an automated display mount holding a television in a raised forward position.

FIG. 33 shows an automated display mount 100 holding a television 110 in a raised forward position. The description of the display mount 100 of FIGS. 1-13 applies to the display mount 100 unless indicated otherwise. The components and features discussed in connection with FIGS. 33-36 can be incorporated into the embodiments of FIGS. 1-32.

Referring now to FIG. 33, the display mount 100 can include a controller device 3020 and motors **3000*a*, 3000*b*, 3000*c*, 3000*d* (collectively "motors 3000"), actuators, and automation devices that can configure the display mount 100 to move the television 110. A user can use a controller 3010** to communicate with the controller device 3020 communicatively coupled to the motors 3000. The controller device 3020 can include a communication device (e.g., transmitter, receiver, and/or the like) communicatively coupled (e.g., wirelessly coupled, capacitively coupled, inductively coupled, or the like) to a transmitter of the controller 3010. In some embodiments, the controller 3010 is a remote that communicates, via wireless communications (e.g., wireless network communications, infrared, etc.), with the controller device 3020 and/or a network.

The controller 3010 can include, or be compatible with, one or more IoT device(s) 3031 (e.g., speakers, hubs or automation devices, such as Echo Dot, HomePod, Sonos speaker, Zigbee controller, Matter controller, etc.) or a suitable device for receiving input from users. Additionally or alternatively, voice commands can be used to control (e.g., raise, lower, perform routines, etc.) the display mount 100, program the controller device 3010, modify programming (e.g., setup schedules, modify schedules, etc.), or the like. In some embodiments, the controller 3010 can communicate via wirelessly or via a wired connection with another device, such as an IoT hub or digital assistant (e.g., Google Home, Microsoft Cortana, Amazon Alexa, etc.). Wireless communication can be via a local network (e.g., WiFi network) or other suitable network. Additionally or alternatively, the controller device 3020 can communicate with a hub, router, or electronic controller, such as Google Home, Amazon Echo, or the like. In some embodiments, the display mount 100 can be controlled with one or more voice commands, such as "Siri" (Apple), "Alexa" (Amazon), "Cortana" (Microsoft), Xbox, "OK Google" Google, and so forth. An input device (e.g., touch screen, button, etc.) of the controller 3010 can be used to input voice commands. The controller device 3020 can have one or more voice detectors (e.g., microphones) configured to receive voice commands.

The controller 3010 and/or controller device 3020 can communicate directly with any number of communication devices and may include one or more sensors 3326 for detecting one or more environmental parameters, movement, position, temperatures, combinations thereof, or the like. By way of example, the controller device 3020 can include motion sensors configured to detect motion, such as gestures. Position sensors can be used to detect the position of obstacles. The controller device 3020 can have proximity sensors for detecting the position of viewers, objects, or the like. Viewer motion and position can be tracked to identify command gestures, positional information (e.g., optimum viewing positions), and so forth. In one embodiment, the controller device 3020 includes one or more sensors 3326 and/or cameras for determining the position/motion of viewers, identifying objects, etc., and the controller device 3020 can determine the optimal display location using viewing algorithms. Identification software (e.g., facial recognition software) can be used to identify different people and to retrieve appropriate positions.

Microphones can receive audible information. The controller 3010 and/or controller device 3020 can be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the display mount 100. Additionally or alternatively, the controller device 3020 can be programmed to move the display to various locations based upon, for example, the location of viewers, time settings, schedules, or voice commands. A timer can be used to determine when to automatically raise or lower the display. In some embodiments, authentication can be required to move the display. For example, the display mount 100 can be actuated only when an authorization password or other identifier is provided. This way children or other individuals cannot move the display.

Operation of the display mount 100 be coordinated with media content, including music, television show, movie, video game, or other suitable media. In one mode of operation, the mount 100 can identify the start of the media (e.g., a movie, sports game, etc.) and can automatically position the display at a suitable viewing position. At the end of the content (e.g., completion of the movie, game, etc.), the display mount 100 can automatically be raised to the stowed position. When the display mount 100 is moved, it can send data to one or more other mounting systems. The data can include setting information, instructions, commands, or the like.

Mounting systems can be programmed for coordinated operations. Each controller device can have stored instructions and can communicate with each other via wired or wireless connections. In some embodiments, the mounting systems communicate with each other via a local network 3350. Controller devices can be programmed to move mounting systems according to one or more cycles or events. In commercial settings, mounting systems can periodically move to attract attention at, for example, a restaurant, a sports bar, or the like. The mounting systems can be television mounting systems, soundbar mounting systems, or the like.

If the display mount 100 is mounted above a mantelshelf, the controller device 3020 can be programmed to ensure that the mounting system does not strike the mantel (e.g., an upper surface of the mantelshelf) as a television is lowered downwardly past the mantelshelf. At a predetermined time (e.g., after a selected bedtime, when a user leaves the residence, when a user exits a geofence region, etc.), the display mount 100 can be automatically moved to the stowed configuration such that children cannot easily reach and pull on the television. In some embodiments, the display mount 100 can be automatically returned to the stowed configuration after the television has been turned OFF for a certain period of time.

The controller device 3020 can be programmed to move the television to different positions, each having a different indicator (e.g., number, code, etc.). The indicator can be entered using the controller 3010. Additionally or alternatively, the controller device 3020 can include input devices, such as a touch pad, a touch screen, a keyboard, or the like. A user can use the input device to move the display mount 100 to different positions without utilizing any remote. If the controller device 3020 is hidden behind a television, the user can reach behind the television to access the controller device 3020 and position the television as desired. The controller 3010 can be a phone (e.g., smartphone), a tablet, a computer, a smartwatch, a game system, smart speaker, an IoT hub, or another suitable electronic device for controlling motorized tilt mechanisms, motorized swivels, or other components.

The television mount 100 (FIG. 33) can be configured to move the television 110 based on one or more signals from the controller 3010. The controller 3010 can be configured to wirelessly communicate with the controller device 3020 and can be used to sequentially move the television 110 in different directions, sequentially move the television mount 100 to different configurations, program the television mount 100, etc. At least one of the controller 3010 or the controller device 3020 can include one or more processors and memory storing acceptable environmental conditions (e.g., ambient temperatures less than, for example, 110° F., 115° F., 120° F.), a user-selected target viewing environment (or a user-selected target viewing position or target viewing range) and instructions executable by the one or more processors to cause the television mount 100 to move the television 110 so as to keep the television 110 at the user-selected viewing environment. In some embodiments, the controller 3010 and/or the controller device 3020 is programmed to cause the automated television mount 100 to move the television 110 away from a wall 120, and after moving the television 110 away from a wall 120, the automated television mount 100 moves the television vertically. The controller 3010 and/or the controller device 3020 can be programmed to receive an operational parameter, determine an action based on the operational parameter, and/or command the television mount 100 to perform the action. The operational parameter can be a temperature measurement, a light measurement, and/or a moisture measurement. The action can be stopping movement of the television, stopping operation of at least one motor or actuator, and/or moving the television to a target viewing environment, viewing position, etc. The user can select viewing environments (or positions), operation parameters, and/or actions based on, for example, characteristics of the television mount 100, installation location, etc.

In some embodiments, the controller 3010 and/or the controller device 3020 can be programmed to monitor an environment, detect one or more environmental conditions based on the monitoring of the environment, and move the television based on detected one or more environmental conditions to keep the television within a target environment. In some embodiments, the controller 3010 and/or the controller device 3020 can receive user input for determining the target environment. The user input can include at least one of temperature information, moisture information, or light information. In some embodiments, the controller 3010 and/or the controller device 3020 can receive target information from a user device setting one or more parameters of the target environment. The controller 3010 and/or the controller device 3020 can receive (e.g., via network 3350) one or more settings for the target environment from a remote server. In some embodiments, the controller 3010 and/or the controller device 3020 can receive one or more voice commands from a user and to control operation of the automated television mount based on the one or more received voice commands. In some embodiments, target information can be received (e.g., from a user device) to set one or more parameters of the target environment/position. The controller 3010 and/or the controller device 3020 can be programmed to receive one or more voice commands from a user and to control operation of the television mount 100 based on the one or more voice commands and the target environment.

The television mount 100 can include one or more sensors configured to detect environmental parameters. The controller 3010 and/or the controller device 3020 can be programmed to control operation of television mount 100 based on output from the one or more sensors to limit or prevent an adverse event. The adverse event can be at least one of a malfunction, adverse operation of a motor of the automated television mount (e.g., motor reaching a temperature exceeding an acceptable operational temperature range), striking of an object, exposing the television 110 and/or display mount 100 to an adverse environmental condition (e.g., exposed to an ambient temperature above a threshold temperature, such as 110° F., 115° F., 120° F., etc.), adverse viewing condition for the television (e.g., high ambient illuminance levels, such as illuminance levels at or above 250 Lux, 300 Lux, 350 Lux, 400 Lux, etc.), and/or adverse environment condition for the television (e.g., excess moisture, rain, etc.). The controller 3010 and/or the controller device 3020 can store rules for determining adverse events and receive rules for determining adverse advents. The rules can be received from the user and/or remote server. A user can be notified (e.g., via text, email, mobile app communication, etc.) when an adverse event is predicted, when an adverse event occurs, etc. Adverse events can be predicted based on, for example, predicted weather (e.g., for televisions installed on exteriors of residences, under outdoor coverings, under pergolas, under gazebos, etc.), trends of ambient temperatures, impaired operation of automation components (e.g., motors, actuators, etc.), or the like.

In some embodiments, the controller 3010 and/or the controller device 3020 can include a non-transitory, machine-readable medium comprising a set of instructions that, when executed by one or more processors, direct the one or more processors to perform a method that includes receiving one or more environmental conditions associated with a television, receiving output from at least one sensor of the display mount 100, determining whether the television 110 is at a target environment (or target position) based on the output and the one or more environmental conditions, and in response to determining the television is not at the target environment, causing the display mount 100 to move the television to the target environment. The method can further include receiving one or more user parameters defining the target environment (or position). The method can further include determining the target environment/position based on data obtained from the television, a cloud account linked to the television, machine-readable information on the television, etc. The controller 3010 and/or the controller device 3020 can continually or periodically determine whether the television is at the target environment/position.

Figure 34:
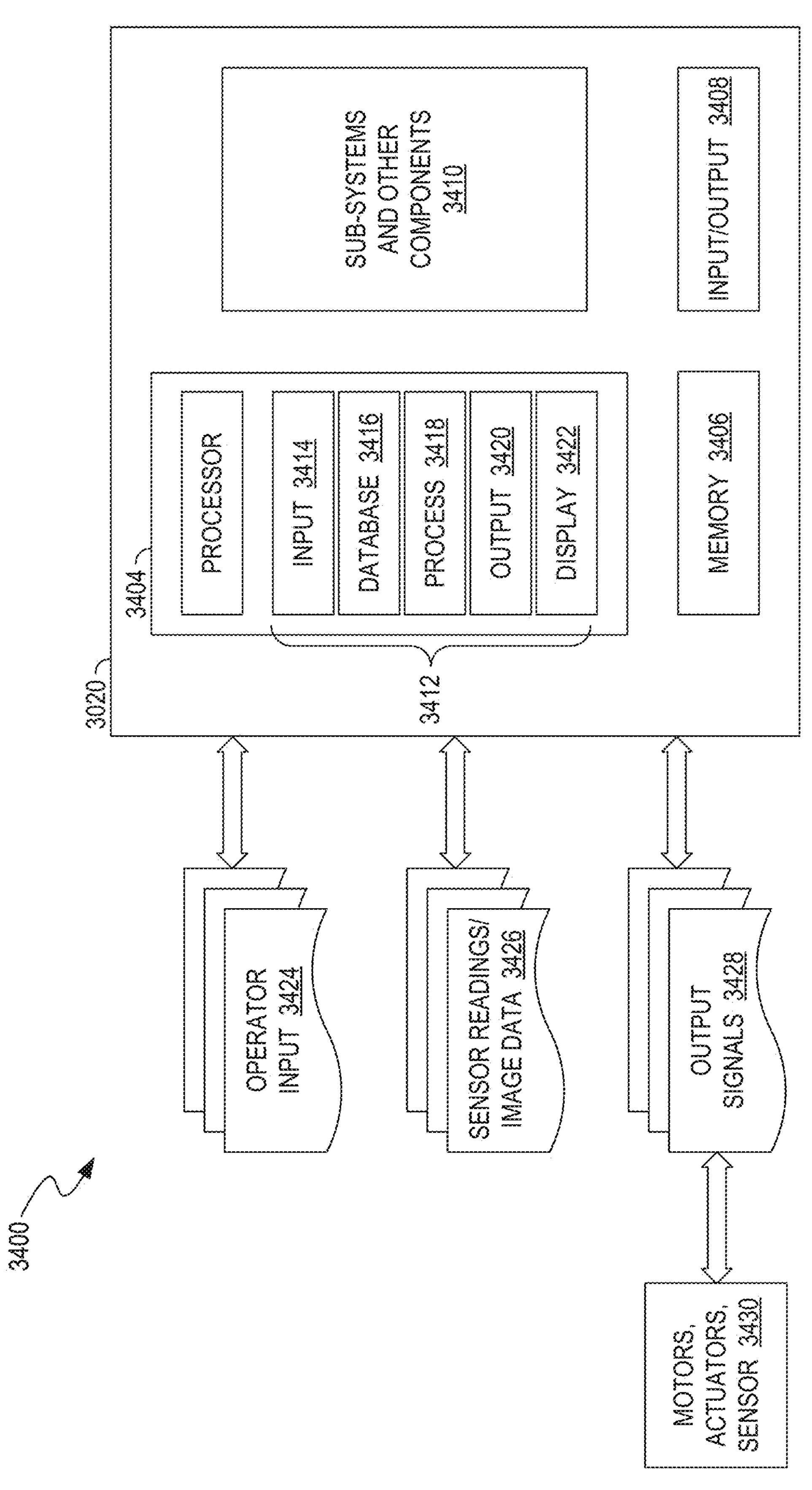
FIG. 34 is a schematic block diagram illustrating subcomponents of a controller device of a display mount in accordance with an embodiment of the technology.

FIG. 34 is a schematic block diagram 3400 illustrating subcomponents of a controller device 3020 in accordance with an embodiment of the disclosure. The controller device 3020 can be incorporated into other systems, mounts, or components disclosed herein. The controller device 3020 can include the controller device 3020 having one or more of each of processors 3404, memory 3406, input/output devices 3408, power regulator, and/or subsystems and other components 3410. The computing device 3020 can perform any of a wide variety of computing processing, storage, sensing, imaging, and/or other functions. Components of the controller device 3020 may be housed in a single unit or distributed over multiple, interconnected units (e.g., through a communications network, such as network 3050 of FIG. 30). The input/output devices 3408 can include, for example, biometric devices. The biometric devices can include, without limitation, fingerprint scanners, eye scanners, facial recognition sensors, cameras, skin sensors, voice recognition devices, or the like. In some fingerprint biometric embodiments, the user can touch the sensor and the controller device 3020 can identify the user based on the user's fingerprint matching a reference fingerprint of the user. The user can then be authorized to perform one or more operations, including programming, setting user-specific settings, modifying settings, or the like. A user can set authorization levels for different authorized users. The authorization levels can include operation of the display mount 100, programming positions, inputting schedules (e.g., when to move automatically move televisions to stowed positions, when to turn ON/OFF televisions, soundbars, etc.), remotely operating the display mount 100, viewing data (e.g., temperature data, environmental data, sensor data, image data, video data) collected by the display mount 100, or the like.

The display mount 100 can detect and avoid obstructions using, for example, auto avoidance programs, stop motion programs, alert routines, or the like. The auto avoidance programs can be executed to move the television 110 while avoiding contacting obstruction(s). The path of travel can be determined based on stored input from the database 3416 of FIG. 30. Stop motion programs can be executed to detect when the display mount 100 and/or television 110 contacts an object. For example, the controller device 3020 can receive input 3426 from, for example, contact sensors to determine that the object has been contacted. The controller device 3020 can then send output signals 3428 (e.g., control signals sent to one or more motors, actuators, sensors, controllers) to stop motion of the television. This can be used to avoid damaging television, mounts, mounted accessories, or adjacent objects. The components of the controller device 3020 can include local and/or remote memory storage devices and any of a wide variety of computer-readable media.

As illustrated in FIG. 34 the processor 3404 can include a plurality of functional modules 3412, such as software modules, for execution by the processor 3404. The various implementations of source code (i.e., in a conventional programming language) can be stored on a computer-readable storage medium or can be embodied on a transmission medium in a carrier wave. The modules 13412 of the processor can include an input module 3414, a database module 3416, a process module 3418, an output module 3420, and, optionally, a display module 3422.

In operation, the input module 3414 accepts an operator input 3424 via the one or more input devices (e.g., controller 3010 of FIG. 33), voice-commands, IoT devices (e.g., IoT device 3031 of FIG. 33), and communicates the accepted information or selections to other components for further processing. The operator input 3424 can include, for example, positioning input, one or more user parameters defining the target environment (e.g., target environment temperatures, ambient light conditions, moisture conditions, etc.), selected position, scene information, accessory control (e.g., soundbar positioning), environment settings, rules for determining adverse events, etc. The information can be displayed via the display 3422. The display 3422 can be a touchscreen or other output device capable of displaying and/or receiving input. In some embodiments, the display 3422 can be forward-facing to allow user to view information directly from the controller device 3020. The position, size, and configuration of the display 3422 can be selected based on the mounting location of the controller device 3020 (e.g., wall mounting portion 133, articulating arms 140, television 110, etc.).

The database module 3416 organizes information, including history of operation (e.g., number and time of adverse events, prior schedules, etc.), adverse event data, position settings, environment settings, drivers (e.g., drivers for soundbars, accessories), and/or protocols (e.g., Zigbee protocols, Matter protocols, Z-wave protocols, WiFi protocols, etc.). Any type of database organization can be utilized, including a flat file system, hierarchical database, relational database, distributed database, etc. In some embodiments, the database module 3416 can store one or more programs. Example programs include, for example, positioning programs for moving the mount 100 and/or television 110 based on, for example, user-inputted settings, program parameters, user motion, or the like. The user-inputted settings can include rates of travel, paths of travel, viewing positions, hard stops, max/min positions, scene information (e.g., movie scenes, sports scenes, other scenes), environmental settings, or the like. To avoid contacting objects, a user can select an input of the input/output devices 3408 to set the controller device 3020 in a mimic or programming mode. A user can then manually pull and move the television 110 between desired positions. The controller device 3020 can detect the position of the television 110 and can then mimic the user's movement at a later time. This allows a user to move a television along complex paths while avoiding objects. In one program and setting, a user can select mimic programming and pull the television 110 horizontally away from the wall. The user can then manually move the television 110 downwardly after the television 110 has cleared the mantel 124. The user can also swivel the television, tilt the television, or perform other actions that are memorized by the controller device 3020. In some embodiments, the display mount 100 can include hard stops (e.g., set screws, installable removable hard stops, position limiters, and other features) for limiting movement. In some embodiments, a sound bar or other accessory 3360 can be mounted to the television 110, display mount 100, or other component. A user can control a motorized sound bar holder using the controller device 3020. For example, the database 3416 of FIG. 30 can include one or more sound bar positioning programs executable to position a sound bar upon movement of the television 110, when the television 110 reaches a preset position, or the like.

In some embodiments, the display mount 100 can include one or more sensors that detects objects that are placed on the mantelshelf 124 or other objects. This allows users to place objects around the television 110 while the mount 100 compensates for those objects. For example, a user can place decorations on the mantel 124 The display mount 100 can detect the objects and modify programs or routines to move the television 110 between user-inputted positions while avoiding contacting the objects. The display mount 100 can be programmed to the size of the television 110, can detect the size of the television, or the like. The sensors can also be coupled to, for example, sound bars, speakers, the television 110.

In the illustrated example, the process module 3418 can generate control variables based on sensor readings and/or image data 3426 from sensors, cameras, and/or other data sources. The sensors can include, without limitations, temperature sensors, light sensors, imaging sensors, cameras contact sensors, accelerometers, gyroscopes, or other suitable sensors.

The output module 3420 can communicate operator input to external computing devices and control variables. The output module 3420 can include one or more communication elements, transmitters, receivers, antennas, ports (e.g., USB ports, LAN port(s), optical port(s), etc.), interfaces, etc. Example interfaces include USB port interfaces, a wired Local Area Network interface (e.g., Ethernet local area network (LAN) interface), a wireless network interface via a WiFi LAN access in accordance with, for example, I.E.E.E. 802.11b/g/n wireless or wireless network communications standard. The display module 3422 can be configured to convert and transmit processing parameters, sensor readings 3426, output signals 3428, via one or more connected display devices, such as a display screen, touchscreen, etc. The output signals 3428 can be sent to one or more components to control or command the components (e.g., motors, swivels, actuators, soundbars, sensors, detectors, etc.). In some embodiments, the output signals 3428 can be sent to motors 3000, actuators, and/or sensors 3326 (see FIG. 33). The sensors can include, for example, onboard sensors configured to detect moisture, rain, light, heat, humidities, or the like. In outside installations of the television 110 of FIG. 2, the display mount 100 can include one or more temperature sensors, rain sensors, sunlight sensors, or the like. The rain sensors can detect rain and can move the television 110 to be close to a wall underneath eaves to avoid excess rain. The temperature sensors can be used to move the television 110 when the television 110 is exposed to direct sunlight that raises the temperature of the screen above a threshold temperature. Sunlight sensors can be used to position the television 110 to, for example, minimize or limit glare or reflection. This allows the televisions 110 to be installed indoors, outdoors, and at a wide range of locations. A user can replace, modify, or install sensors based on the surrounding environment and the capabilities of the television 110. In some embodiments, temperature sensors can be used to monitor operation of motorized devices to, for example, prevent overheating of motors. Notifications can be sent to the user via the network 3050 if the television is at an undesired position, or the like. In some embodiments, the control of the display mount 100 can be cloud based to allow a user to move the television when the user is at a remote location. If the user forgets to raise the television, the user can use a smartphone app, smartwatch app, or other app to view the current position of the television, move the television to a desired position, and send notifications or alerts via the controller device 3020 to an individual in the room watching the television. When the television 110 is moved remotely, one or more audible alerts can be outputted by the controller device 3020 to warn individuals in the room that the television 110 will be moved. This can help avoid inadvertently contacting individuals who may be unaware that the television 110 is to be moved.

In various embodiments, the processor 3404 can be one or more standard central processing units or secure processors. Secure processors can be special-purpose processors (e.g., reduced instruction set processor) that can withstand sophisticated attacks that attempt to extract data or programming logic. The secure processors may not have debugging pins that enable an external debugger to monitor the secure processor's execution or registers. In other embodiments, the system may employ a secure field programmable gate array, a smartcard, or other secure devices. The processor 3404 can be configured to determine one or more actions based on operational parameters from the operator input 3424 and/or readings/data 3426. The controller device 3020 can command the automated television mount 100 to perform at least one action based on the determine one or more actions.

The memory 3406 can be standard memory, secure memory, or a combination of both memory types. By employing a secure processor and/or secure memory, the system can ensure that data and instructions are both highly secure and sensitive operations such as decryption are shielded from observation. In various embodiments, the memory 3406 can be flash memory, secure serial EEPROM, secure field programmable gate array, or secure application-specific integrated circuit. The memory 3406 can store instructions performing any of the methods disclosed herein, including, without limitation processing images, obtain information about screen mounting positions and angles, acquiring information, analyzing mounting heights, or the like. The memory 1406 can include non-transitory computer-readable medium, memory component, etc. carrying instructions, which when executed, causes actions. The actions can include steps disclosed herein. The memory 3406 include a non-transitory, machine-readable medium comprising a set of instructions that, when executed by one or more processors, direct the controller device 3020 to perform a method including receiving one or more environmental conditions, receiving output from at least one sensor, and determining whether the television is at a target environment/position based on the output and the one or more environmental condition.

Figure 35:
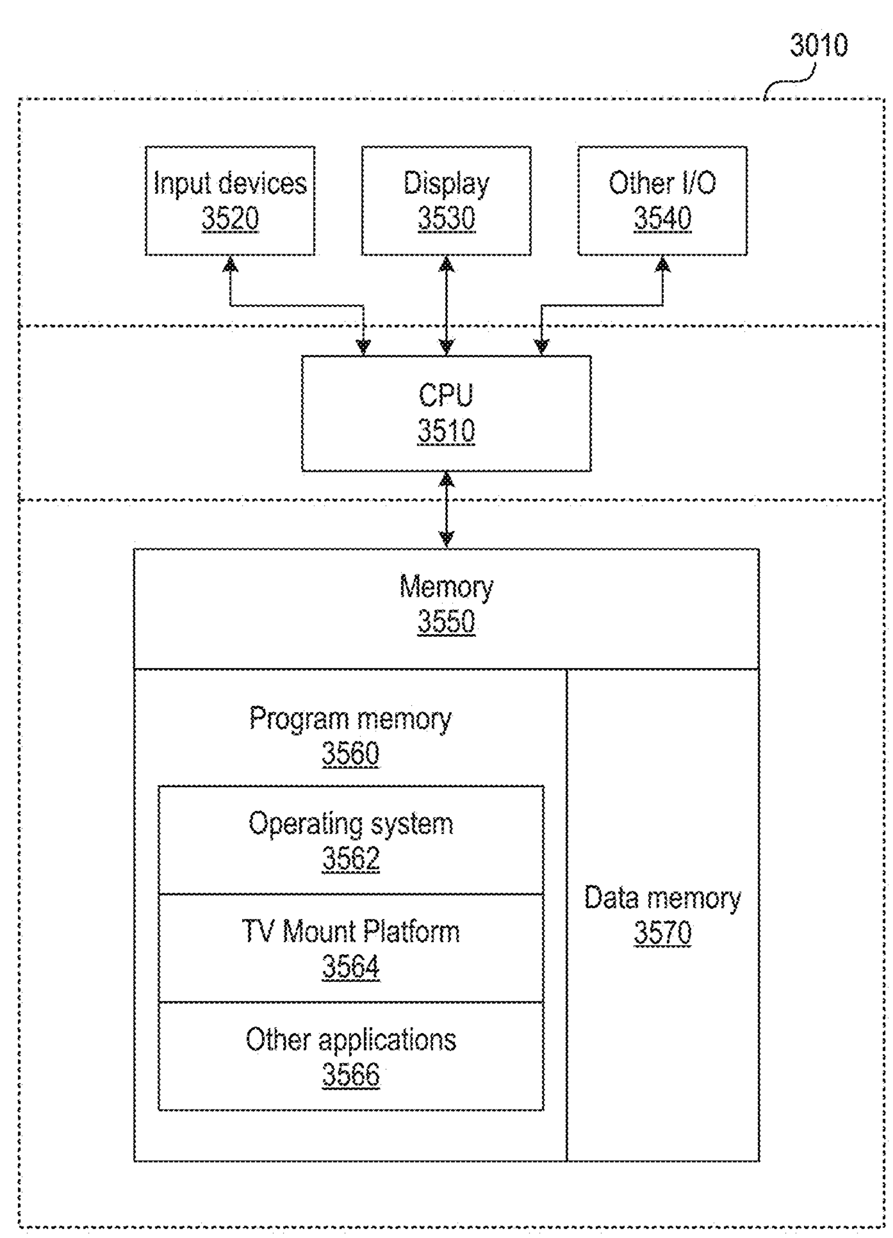
FIG. 35 is a schematic block diagram illustrating subcomponents of a controller in accordance with an embodiment of the technology.

FIG. 35 is a block diagram illustrating an overview of the controller device 3010 in accordance with some embodiments of the technology. Device 3010 can include one or more input devices 3520, 3540 that provide input to the CPU (processor) 3510, notifying it of actions. The actions are typically mediated by a hardware controller that interprets the signals received from the input device and communicates the information to the CPU 3510 using a communication protocol. Input devices 3520 include, for example, a touchscreen, a keyboard, an infrared sensor, a touchpad, a wearable input device, a camera- or image-based input device, a microphone, or other user input devices.

CPU 3510 can be a single processing unit or multiple processing units in a device or distributed across multiple devices. CPU 3510 can be coupled to other hardware devices, for example, with the use of a bus, such as a PCI bus or SCSI bus. The CPU 3510 can communicate with a hardware controller for devices, such as for a display 3530. Display 3530 can be used to display text and graphics. In some examples, display 3530 provides feedback (e.g., graphical feedback, textual visual feedback, audible feedback) to a person operating the device 3020. In some implementations, display 3530 includes the input device as part of the display, such as when the input device is a touchscreen or is equipped with an eye direction monitoring system. In some implementations, the display is separate from the input device. Other I/O devices 3540 can also be coupled to the processor, such as a network card, video card, audio card, USB, FireWire or other external device.

In some implementations, the device 3010 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 3010 can utilize the communication device to distribute operations across multiple network devices.

The CPU 3510 can have access to a memory 3550. A memory can include one or more of various hardware devices for volatile and non-volatile storage and can include both read-only and writable memory. For example, memory 3550 can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. The memory 3550 can include program memory 3560 that stores programs and software. The memory 3550 can also include data memory 3570 that can include various information as described in this patent document, which can be provided to the program memory 3560 or any element of the device 3020. The program memory 3560 can include operating system 3562, a TV mount platform 3564 and other applications 3566 capable of performing the processing tasks as described herein.

Figure 36:
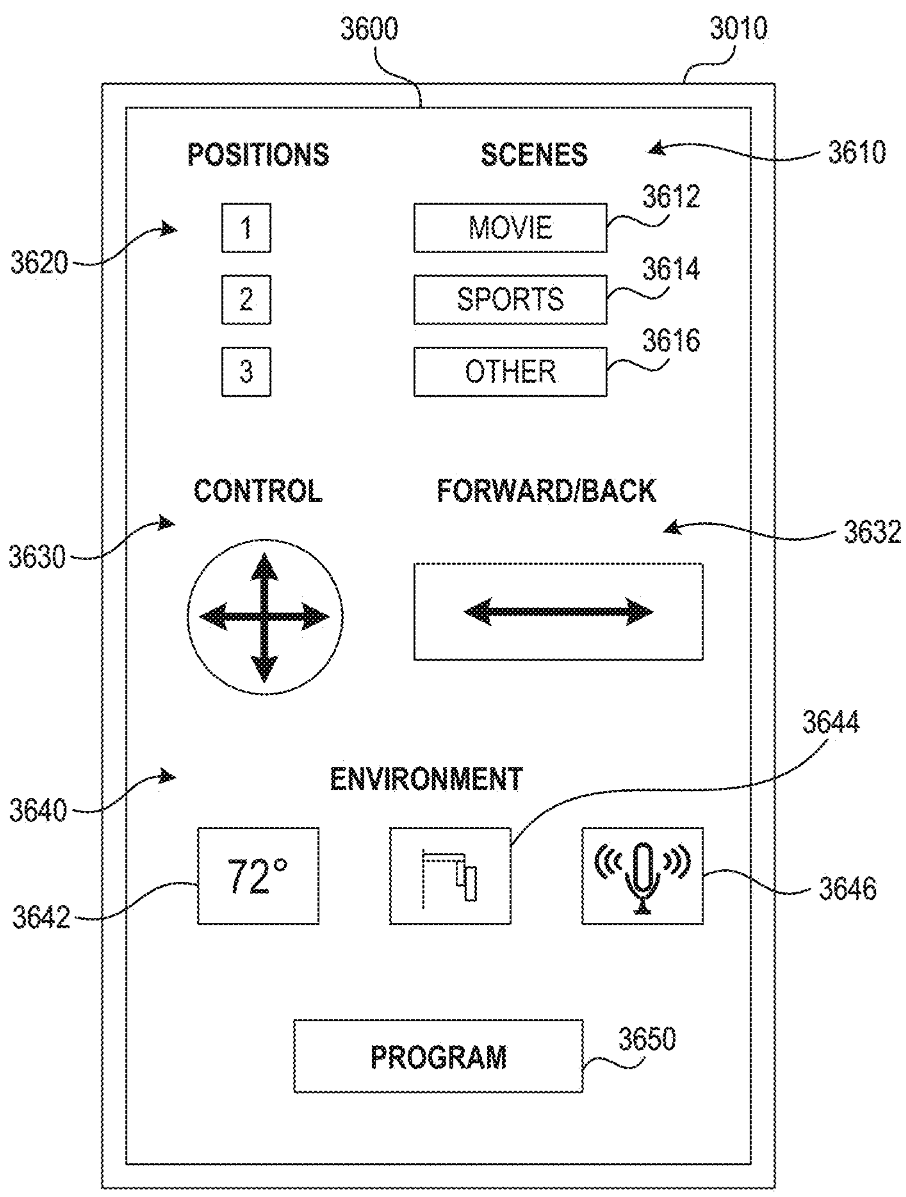
FIG. 36 shows a user interface of a controller in accordance with an embodiment of the technology.

FIG. 36 is an example user interface of the user device 3010 (e.g., controller 3010 of FIG. 33). The illustrated user device 3010 can be in the form of a smartphone, smartwatch, tablet, game system, or other computer device with a display screen 3600. The display screen 3600 can include a graphical user interface (GUI) that includes positioning information, controls, and other information used to position televisions. In some embodiments, the GUI includes user program positions for the television. For example, a number of positions can be preset and displayed. The user can press the first button 1 to move the television to a raised position. The second button 2 can be pressed to move the television to an intermediate position. The third button 3 can be used to move the television to a lowered position. In other embodiments, the position buttons 3620 can correspond to different user settings. For example, a first family member can select the first button to move the television to the user's preferred position. Other family members can have their favorite positions programmed to corresponding other buttons.

The GUI can include scenes 3610 that can be selected to position the television 110 and/or control the environment 3640 (e.g., lighting, sound system, speakers, etc.). The movie button 3612 can be selected to dim IoT lighting to a dark movie setting. An audio system can be connected to the television 110 to provide theater sound. A user can select a sports button 3614 to move the television 110 to a sport watching position. Other scenes can be programmed using the button 3616.

The user device 3010 can include a control 3630 that can be used to raise and lower the television 110. A forward-back button 3632 can be used to move the television away from and towards a wall. This allows a user to manually control the movement and position of the display mount. In some embodiments, a program button 3650 can be selected to initiate programming. A user can then move the television using the controls 3630 and/or forward-back button 3632 to a desired position. The programming button 3650 can be repeatedly pressed to program each of the positions. Those program positions can have corresponding buttons 3620.

The user device 3010 can have selectable elements corresponding to the environment 3640 surrounding the television. In some embodiments, the sensor 3326 of FIG. 33 can be a temperature sensor. The display screen 3600 can display the temperature of the television. For example, the sensor 3326 can be installed on the backside of the television or mount to detect the temperature of the backside of the television 110 through a face in the fireplace. As shown in FIG. 36, the temperature (e.g., 72 degrees) can be displayed in a window 3642 of the GUI. A position window 3644 can display the current position of the mount. This allows a user to view the mount position when the user is at a remote location. A user can select a voice control button 3646 to control the mount via voice commands. For example, a user can select the voice button 3646. The user can then speak one or more voice commands that can be processed locally or remotely, via cloud connection, to control the mount 100. A user can select the button 3650 to program the voice commands with different commands. In some embodiments, the applications can include one or more voice-to-text programs, voice control programs, and other programs that are used to control the television via user voice commands.

EXAMPLES

The present technology is illustrated, for example, according to various aspects described below as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A television mount device, comprising:
 a wall mounting bracket;
 a television mounting bracket configured to carry a television; and
 a lever-pulley counterbalance assembly including:
  a pulley system, and
  a biasing lever that engages the pulley system such that the lever-pulley counterbalance assembly provides a counterbalancing force as the biasing lever rotates from a first position to a second position when the television mounting bracket moves from a raised position to a lowered position.
2. The television mount device of example 1, further comprising a positioner mechanism coupled to the lever-pulley counterbalance assembly, the positioner mechanism including:
 an extender arm assembly coupled to the wall mounting bracket and configured to move the television mounting bracket horizontally away from the wall mounting bracket when the wall mounting bracket is mounted on a vertical wall; and
 a vertical positioner mechanism coupled to the extender arm assembly and the television mounting bracket, wherein the vertical positioner mechanism is configured to move the television mounting bracket when the wall mounting bracket is mounted on the vertical wall.
3. The television mount device of example 1 or example 2, wherein:
 the pulley system includes a flexible connector, and
 the biasing lever includes:
  a lever arm carrying a movable pulley, and
  a biasing device coupled to the lever arm, wherein the biasing device extends or contracts when the movable pulley travels along the connector.
4. The television mount device of any of examples 1-3, wherein the lever-pulley counterbalance assembly includes a lever arm and a spring coupled to the lever arm, wherein the lever arm includes an adjuster configured to move the spring relative to the lever arm to set the counterbalancing force.
5. The television mount device of example 4, wherein the adjuster is configured to translate an end of the spring along a longitudinal axis of the lever arm.
6. The television mount device of any of examples 1-5, wherein the biasing lever includes:
 a lever arm carrying a movable pulley, and
 a biasing device coupled to the lever arm such that a ratio of a distance of travel of the television mounting bracket to a length contraction of the biasing device when the television mounting bracket is moved from between raised position and the lowered position is equal to or greater than 2.
7. The television mount device of any of examples 1-6, wherein the lever-pulley counterbalance assembly includes one or more coil springs, gas pistons, and/or actuators.
8. The television mount device of any of examples 1-7, wherein the pulley system includes a flexible connector having a first end coupled to a fixed vertical plate wall coupled to the wall mounting bracket and a second end coupled to a vertically movable plate coupled to the television mounting bracket.

9. A television mount device, comprising:

a wall mounting bracket;

a television mounting bracket configured to carry a television;

a positioner mechanism configured to allow independent multidirectional linear movement of the television mounting bracket; and a lever-pulley counterbalance assembly including:

a pulley system connected to the positioner mechanism, and a biasing lever that engages the pulley system such that the lever-pulley counterbalance assembly provides a counterbalancing force as the biasing lever rotates from a first position to a second position when the television mounting bracket moves from a raised position to a lowered position.

10. The television mount device of example 9, wherein the positioner mechanism includes:

an extender assembly coupled to the wall mounting bracket and configured to move the television mounting bracket away from the wall mounting bracket; and a vertical positioner mechanism coupled to the extender assembly and the television mounting bracket.

11. The television mount device of example 9 or example 10, wherein the biasing lever includes:

a lever arm carrying a movable pulley, and a biasing device coupled to the lever arm and the positioner mechanism, wherein the biasing device extends or contracts when the movable pulley travels along a flexible connector of the pulley system.

12. The television mount device of any of examples 9-11, wherein the lever-pulley counterbalance assembly includes a lever arm and a spring coupled to the lever arm, wherein the lever arm includes an adjuster configured to move the spring relative to the lever arm to adjust counterbalancing.

13. The television mount device of example 12, wherein the adjuster is configured to translate an end of the spring along a longitudinal axis of the lever arm.

14. The television mount device of any of examples 9-13, wherein the biasing lever includes:

a lever arm carrying a movable pulley, and a biasing device coupled to the lever arm and the positioner mechanism, wherein a ratio of a distance of travel of the television mounting bracket to a length contraction of the biasing device when the television mounting bracket is moved from between raised position and the lowered position is equal to or greater than 2.

15. The television mount device of any of examples 9-14, wherein the lever-pulley counterbalance assembly includes one or more coil springs, gas pistons, or actuators.

16. The television mount device of any of examples 9-15, wherein the pulley system includes a flexible connector having a first end coupled to a fixed vertical plate of the positioner mechanism and a second end coupled to a vertically movable plate of the positioner mechanism.

17. The television mount device of any of examples 9-16, wherein the biasing lever is rotatable along an imaginary plane that is generally parallel to a front face of the television mounting bracket.

18. A television mount device, comprising:

a wall mounting bracket;

a television mounting bracket configured to carry a television; and a lever-pulley counterbalance assembly including:

a vertical fixed plate coupled to the wall mounting bracket;

a vertical moving plate coupled to the television mounting bracket;

a pulley arm pivotably coupled to the vertical moving plate;

a biasing element pivotably coupled between the vertical moving plate and the pulley arm;

a pulley rotatably coupled to a distal end portion of the pulley arm; and a connector coupled between a first pivot of the vertical fixed plate and a second pivot of the vertical moving plate, wherein the connector extends around the pulley.

19. The television mount device of example 18, wherein, when the lever-pulley counterbalance assembly is configured to move between a raised position and a lowered position— the pulley is configured to move relative to the vertical moving plate by a first distance, and the vertical moving plate is configured to move relative to the vertical fixed plate by a second distance about twice the first distance.

20. The television mount device of example 18 or example 19, wherein the lever-pulley counterbalance assembly is configurable between:

a raised position in which the first pivot is located closer to the pulley than the second pivot, and a lowered position in which the second pivot is located closer to the pulley than the first pivot.

21. The television mount device of any of examples 18-20, further comprising an actuator pivotably coupled between the vertical moving plate and the pulley arm.

22. The television mount device of any of examples 18-21, wherein the biasing element comprises a first biasing element, and wherein the television mount device further comprises a second biasing element pivotably coupled between the vertical moving plate and the pulley arm and extending at a non-parallel angle relative to the first biasing element.

23. The television mount device of any of examples 18-22, wherein the vertical moving plate comprises a plurality of connection points to which the biasing element can be coupled.

24. A television mounting system, comprising:

an automated television mount configured to carry a television between two or more positions, the automated television mount including a controller device; and a controller configured to wirelessly communicate with the controller device, wherein at least one of the controller or the controller device is programmable to move the television sequentially in different directions.

25. The television mounting system of example 24, wherein the at least one of the controller or the controller device includes one or more processors and memory, wherein the memory stores a user-selected target viewing environment and instructions executable by the one or more processors to cause the automated television mount to move the television to keep the television at the user-selected target viewing environment.

26. The television mounting system of example 24 or example 25, wherein the at least one of the controller or the controller device is programmed to cause the automated television mount to move the television away from a wall to which the automated television mount is coupled, and after moving the television away from a wall, move the television downwardly.

27. The television mounting system of any of examples 24-26, wherein at least one of the controller or the controller device is programmed to:

receive an operational parameter, determine an action based on the operational parameter, and command the automated television mount to perform the action.

28. The television mounting system of example 27, wherein the operational parameter is a temperature measure, a light measurement, or a moisture measurement.

29. The television mounting system of example 27, wherein the action is at least one of stopping movement of the television, stopping operation of at least one motor or actuator of the automated television mount, and moving the television to a target position.

30. The television mounting system of any of examples 24-29, wherein the at least one of the controller or the controller device is programmed to:

monitor an environment, detect one or more environmental conditions based on the monitoring of the environment, and move the television based on detected one or more environmental conditions to keep the television exposed to one or more acceptable environmental conditions.

31. The television mounting system of example 30, wherein the at least one of the controller or the controller device receives user input for determining the one or more acceptable environmental conditions.

32. The television mounting system of example 31, wherein the user input includes at least one of temperature information, moisture information, or light information.

33. The television mounting system of example 30, wherein the at least one of the controller or the controller device receives target information from a user device that sets the one or more acceptable environmental conditions of a target environment for the television.

34. The television mounting system of example 30, wherein the at least one of the controller or the controller device receives one or more settings for a target environment from a remote server.

35. The television mounting system of any of examples 24-34, wherein at least one of the controller or the controller device is programmed to receive one or more voice commands from a user and to control operation of the automated television mount based on the one or more voice commands.

36. The television mounting system of example 29, wherein the automated television mount includes one or more sensors configured to detect environmental parameters, wherein at least one of the controller or the controller device is programmed to control operation of automated television mount based on output from the one or more sensors to limit or prevent an adverse event.

37. The television mounting system of example 36, wherein the adverse event is at least one of adverse operation of a motor of the automated television mount, striking of an object, exposing the television to an adverse environmental condition, or exposing the television to an adverse viewing condition for the television.

38. A method of controlling an automated television mount, the method comprising receiving one or more environmental conditions;

receiving output from at least one sensor of an automated display mount;

determining whether the television is at a target environment based on the output and the one or more environmental conditions; and in response to determining the television is not at the target environment, causing the automated display mount to move the television to the target environment.

39. The method of example 38, further comprising receiving one or more user parameters defining the target environment.

40. The method of example 38 or example 39, further comprising determining the target environment based on data obtained from the television.

41. The method of any of examples 38-40, further comprising determining a target position for the television such that the entire television is within the target environment.

42. A non-transitory, machine-readable medium comprising a set of instructions that, when executed by one or more processors, direct the one or more processors to perform a method comprising:

receiving one or more environmental conditions associated with a television;

receiving output from at least one sensor of an automated display mount;

determining whether the television is at a target environment based on the output and the one or more environmental conditions; and in response to determining the television is not at the target environment, causing the automated display mount to move the television to the target environment.

43. The non-transitory, machine-readable medium of example 42, wherein the method further comprises receiving one or more user parameters defining the target environment.

44. The non-transitory, machine-readable medium of example 42 or example 43, wherein the method further comprises determining the target environment based on data obtained from the television.

45. The non-transitory, machine-readable medium of any of examples 42-44, further comprising determining a target position for the television such that the entire television is within the target environment.

RELATED APPLICATIONS AND PATENTS

Additional apparatuses, components, controllers, software, methods of operation, methods for manufacturing, and other features are disclosed in the following patents and applications: U.S. Patent Application No. 61/396,850; U.S. Pat. Nos. 8,724,037; 8,864,092; 8,724,037; 9,625,091; 9,876,984; 10,257,460; 10,277,860; 11,287,080; U.S. Patent Application No. 61/913,195; U.S. Pat. Nos. 9,625,091;

10,281,080; U.S. patent application Ser. No. 16/033,972; U.S. patent application Ser. No. 16/370,854; U.S. patent application Ser. No. 16/924,551; U.S. patent application Ser. No. 17/026,088; U.S. patent application Ser. No. 16/375,835; U.S. patent application Ser. No. 17/090,701; U.S. patent application Ser. No. 17/876,950; U.S. patent application Ser. No. 17/173,116; U.S. Patent Application No. 62/553,961; U.S. Pat. No. 10,738,941; U.S. patent application Ser. No. 16/918,718; International Application No. PCT/US21/17141; U.S. Patent Application No. 62/950,524; U.S. Patent Application No. 62/972,643; and U.S. Patent Application No. 62/971,974. For example, cam mechanisms, tilting features, pivot features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. All patents, applications, and other references cited herein are hereby incorporated by reference in their entirety. Any and all priority claims identified in the Application Data Sheet, or any correction thereto, are also hereby incorporated by reference in their entirety.

Reference throughout this specification to "one embodiment" or "an embodiment" means that a particular feature, structure, or characteristic described in connection with the embodiment is included in at least one embodiment of the present invention. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A television mount device, comprising:
- a wall mounting bracket;
- a television mounting bracket configured to carry a television; and
- a lever-pulley counterbalance assembly including:
  - a pulley system, and
  - a biasing lever that engages the pulley system such that the lever-pulley counterbalance assembly provides a counterbalancing force as the biasing lever rotates from a first position to a second position when the television mounting bracket moves from a raised position to a lowered position, wherein the biasing lever includes (i) a vertical moving plate, (ii) a pulley arm pivolably coupled to the vertical moving plate, (iii) a first biasing element coupled between the vertical moving plate and the pulley arm, and (iv) a second biasing element coupled between the vertical moving plate and the pulley arm and extending at a non-parallel angle relative to the first biasing element.

2. The television mount device of claim 1, further comprising a positioner mechanism coupled to the lever-pulley counterbalance assembly, the positioner mechanism including:
- an extender arm assembly coupled to the wall mounting bracket and configured to move the television mounting bracket horizontally away from the wall mounting bracket when the wall mounting bracket is mounted on a vertical wall; and
- a vertical positioner mechanism coupled to the extender arm assembly and the television mounting bracket, wherein the vertical positioner mechanism is configured to move the television mounting bracket when the wall mounting bracket is mounted on the vertical wall.

3. The television mount device of claim 1, wherein:
- the pulley system includes a flexible connector, and
- the biasing lever includes:
  - a lever arm carrying a movable pulley, and
  - a biasing device coupled to the lever arm, wherein the biasing device extends or contracts when the movable pulley travels along the connector.

4. The television mount device of claim 1, wherein the lever-pulley counterbalance assembly includes a lever arm and a spring coupled to the lever arm, wherein the lever arm includes an adjuster configured to move the spring relative to the lever arm to set the counterbalancing force.

5. The television mount device of claim 4, wherein the adjuster is configured to translate an end of the spring along a longitudinal axis of the lever arm.

6. The television mount device of claim 1, wherein the biasing lever includes:
- a lever arm carrying a movable pulley, and
- a biasing device coupled to the lever arm such that a ratio of a distance of travel of the television mounting bracket to a length contraction of the biasing device when the television mounting bracket is moved from between raised position and the lowered position is equal to or greater than 2.

7. The television mount device of claim 1, wherein the lever-pulley counterbalance assembly includes one or more coil springs, gas pistons, and/or actuators.

8. The television mount device of claim 1, wherein the pulley system includes a flexible connector having a first end coupled to a fixed vertical plate wall coupled to the wall mounting bracket and a second end coupled to a vertically movable plate coupled to the television mounting bracket.

9. A television mount device, comprising:
- a wall mounting bracket;
- a television mounting bracket configured to carry a television;
- a positioner mechanism configured to allow independent multidirectional linear movement of the television mounting bracket; and
- a lever-pulley counterbalance assembly including:
  - a pulley system connected to the positioner mechanism, wherein the pulley system includes a pulley and a connector coupled to a first connector mount and a second connector mount, wherein the connector extends around the pulley, and
  - a biasing lever that includes a pulley arm having a distal end supporting the pulley, wherein the biasing lever engages the pulley system such that the lever-pulley counterbalance a assembly provides counterbalancing force as the biasing lever rotates from a first position to a second position when the television mounting bracket moves from a raised position to a lowered position, and wherein a sum of a first distance between the first connector mount and the pulley and a second distance between the second connector mount and the pulley remains constant as the television mounting bracket moves from the raised position to the lowered position.

10. The television mount device of claim 9, wherein the positioner mechanism includes:

an extender assembly coupled to the wall mounting bracket and configured to move the television mounting bracket away from the wall mounting bracket; and a vertical positioner mechanism coupled to the extender assembly and the television mounting bracket.

11. The television mount device of claim 9, wherein the biasing lever includes:

a lever arm carrying a movable pulley, and a biasing device coupled to the lever arm and the positioner mechanism, wherein the biasing device extends or contracts when the movable pulley travels along a flexible connector of the pulley system.

12. The television mount device of claim 9, wherein the lever-pulley counterbalance assembly includes a lever arm and a spring coupled to the lever arm, wherein the lever arm includes an adjuster configured to move the spring relative to the lever arm to adjust counterbalancing.

13. The television mount device of claim 12, wherein the adjuster is configured to translate an end of the spring along a longitudinal axis of the lever arm.

14. The television mount device of claim 9, wherein the biasing lever includes:

a lever arm carrying a movable pulley, and a biasing device coupled to the lever arm and the positioner mechanism, wherein a ratio of a distance of travel of the television mounting bracket to a length contraction of the biasing device when the television mounting bracket is moved from between raised position and the lowered position is equal to or greater than 2.

15. The television mount device of claim 9, wherein the lever-pulley counterbalance assembly includes one or more coil springs, gas pistons, or actuators.

16. The television mount device of claim 9, wherein the pulley system includes a flexible connector having a first end coupled to a fixed vertical plate of the positioner mechanism and a second end coupled to a vertically movable plate of the positioner mechanism.

17. The television mount device of claim 9, wherein the biasing lever is rotatable along an imaginary plane that is generally parallel to a front face of the television mounting bracket.

18. A television mount device, comprising:

a wall mounting bracket;

a television mounting bracket configured to carry a television; and a lever-pulley counterbalance assembly including:

a vertical fixed plate coupled to the wall mounting bracket;

a vertical moving plate coupled to the television mounting bracket;

a pulley arm pivotably coupled to the vertical moving plate;

a biasing element pivotably coupled between the vertical moving plate and the pulley arm;

a pulley rotatably coupled to a distal end portion of the pulley arm; and a connector coupled between a first connector mount of the vertical fixed plate and a second connector mount of the vertical moving plate, wherein the connector extends around the pulley, wherein the lever-pulley counterbalance assembly is configurable between:

a raised position in which the first connector mount is located closer to the pulley than the second connector mount, and a lowered position in which the second connector mount is located closer to the pulley than the first connector mount.

19. The television mount device of claim 18, wherein, when the lever-pulley counterbalance assembly is configured to move between a raised position and a lowered position— the pulley is configured to move relative to the vertical moving plate by a first distance, and the vertical moving plate is configured to move relative to the vertical fixed plate by a second distance about twice the first distance.

20. The television mount device of claim 18, further comprising an actuator pivotably coupled between the vertical moving plate and the pulley arm.

21. A television mount device, comprising:

a wall mounting bracket:

a television mounting bracket configured to carry a television; and a lever-pulley counterbalance assembly including:

a vertical fixed plate coupled to the wall mounting bracket;

a vertical moving plate coupled to the television mounting bracket;

a pulley arm pivolably coupled to the vertical moving plate;

a biasing element pivotably coupled between the vertical moving plate and the pulley arm, wherein the biasing element comprises a first biasing element;

a second biasing element pivotably coupled between the vertical moving plate and the pulley arm and extending at a non-parallel angle relative to the first biasing element;

a pulley rotatably coupled to a distal end portion of the pulley arm; and a connector coupled between a first connector mount of the vertical fixed plate and a second connector mount of the vertical moving plate, wherein the connector extends around the pulley.

22. The television mount device of claim 18, wherein the vertical moving plate comprises a plurality of connection points to which the biasing element can be coupled.

* * * * *